United States Patent
Iwata et al.

(10) Patent No.: US 7,968,177 B2
(45) Date of Patent: *Jun. 28, 2011

(54) ANTI-GLARE OPTICAL MULTILAYER BODY

(75) Inventors: Yukimitsu Iwata, Aioi (JP); Koichi Mikami, Okayama (JP); Yoshihiro Nishimura, Okayama (JP); Takashi Kodama, Okayama (JP)

(73) Assignee: Dai Nippon Printing Co., Ltd., Shinjuku-ku (JP)

( * ) Notice: Subject to any disclaimer, the term of this patent is extended or adjusted under 35 U.S.C. 154(b) by 311 days.

This patent is subject to a terminal disclaimer.

(21) Appl. No.: 11/884,404

(22) PCT Filed: Feb. 21, 2006

(86) PCT No.: PCT/JP2006/303060
§ 371 (c)(1),
(2), (4) Date: Mar. 28, 2008

(87) PCT Pub. No.: WO2006/088204
PCT Pub. Date: Aug. 24, 2006

(65) Prior Publication Data
US 2009/0021834 A1 Jan. 22, 2009

(30) Foreign Application Priority Data

Feb. 21, 2005 (JP) .................. 2005-044231
Mar. 29, 2005 (JP) .................. 2005-095919

(51) Int. Cl.
*G02B 1/10* (2006.01)
*G02B 5/30* (2006.01)
(52) U.S. Cl. ............ 428/220; 428/179; 428/320.2; 349/96; 359/580; 252/500
(58) Field of Classification Search ........... 428/220; 359/580
See application file for complete search history.

(56) References Cited

U.S. PATENT DOCUMENTS

| | | | | |
|---|---|---|---|---|
| 5,178,928 A * | 1/1993 | Goto et al. | ........... | 428/106 |
| 5,925,438 A * | 7/1999 | Ota et al. | ........... | 428/141 |
| 6,445,504 B1 * | 9/2002 | Suga et al. | ........... | 359/599 |
| 6,638,566 B1 * | 10/2003 | Lee | ........... | 427/64 |
| 6,696,140 B2 | 2/2004 | Suzuki | | |
| 7,037,573 B2 * | 5/2006 | Miyatake et al. | ........... | 428/195.1 |
| 7,245,433 B2 | 7/2007 | Yano et al. | | |
| 7,542,207 B2 | 6/2009 | Matsunaga | | |
| 2002/0122257 A1 * | 9/2002 | Suga et al. | ........... | 359/580 |
| 2003/0176156 A1 * | 9/2003 | Braunschweig et al. | ........... | 451/526 |
| 2005/0030444 A1 * | 2/2005 | Fujiwara et al. | ........... | 349/64 |
| 2005/0063066 A1 * | 3/2005 | Namioka et al. | ........... | 359/613 |
| 2008/0174875 A1 * | 7/2008 | Iwata et al. | ........... | 359/599 |

FOREIGN PATENT DOCUMENTS

JP 09-193333 A1 7/1997

(Continued)

OTHER PUBLICATIONS

Machine English Translation of JP 9-193333, Glare Protecting Film, Jul. 29, 1997, Derwent, pp. 1-7.*

Primary Examiner — Angela Ortiz
Assistant Examiner — Tahseen Khan
(74) Attorney, Agent, or Firm — Burr & Brown

(57) ABSTRACT

An anti-dazzling laminate formed from an optical laminate having a light transparent base material and an anti-dazzling layer provided on the light transparent base material. The optical laminate is produced by providing the light transparent base material and forming the anti-dazzling layer having a concavoconvex shape on the light transparent base material, wherein the concavoconvex shape of the anti-dazzling layer satisfies the following requirements: Sm is not less than 100 μm and not more than 600 μm, θa is not less than 0.1 degree and not more than 1.2 degrees, and Rz is more than 0.2 μm and not more than 1 μm, wherein Sm represents the average spacing of concavoconvexes (or profile irregularities) in the anti-dazzling layer; θa represents the average inclination angle of the concavoconvexes (or profile irregularities); and Rz represents the average roughness of the concavoconvexes (or profile irregularities).

24 Claims, 5 Drawing Sheets

FOREIGN PATENT DOCUMENTS

| | | |
|---|---|---|
| JP | 09193333 A * | 7/1997 |
| JP | 2000-206317 A1 | 7/2000 |
| JP | 2000-215720 A1 | 8/2000 |
| JP | 2000-338310 A1 | 12/2000 |
| JP | 2002-189107 A1 | 7/2002 |
| JP | 2003-004903 A1 | 1/2003 |
| JP | 2003-248110 | 9/2003 |
| JP | 2004-050607 A1 | 2/2004 |
| JP | 2004-061853 A1 | 2/2004 |
| JP | 2004-322566 A1 | 11/2004 |
| JP | 2004-341070 A1 | 12/2004 |
| WO | 95/31737 | 11/1995 |
| WO | 03/079059 A1 | 9/2003 |
| WO | WO 03079059 A1 * | 9/2003 |
| WO | 03/085424 A1 | 10/2003 |

* cited by examiner

X: 10 μm/div
Z: 2000nm/div

ANTI-GLARE OPTICAL MULTILAYER BODY

CROSS-REFERENCE TO RELATED APPLICATIONS

This application is based upon and claims the benefit of priority from the prior Japanese Patent Applications No. 44231/2005 and No. 95919/2005 under the Paris Convention, and, thus, the entire contents thereof are incorporated herein by reference.

FIELD OF THE INVENTION

The present invention provides an anti-dazzling optical laminate for use in displays such as CRTs and liquid crystal panels.

BACKGROUND OF THE INVENTION

The prevention of lowered contrast and lowered visibility caused by external light reflection or image reflection is required of image display devices, for example, cathode-ray tube display devices (CRTs), plasma displays (PDPs), electroluminescent displays (ELDs), or liquid crystal displays (LCDs). Accordingly, it is common practice to provide a reflection preventive laminate on the outermost surface of an image display device from the viewpoint of reducing image reflection or reflectance using the principle of light scattering or the principle of optical interference.

In image display devices, for example, liquid crystal displays, the use of an anti-dazzling laminate as one of antireflection laminates has hitherto been known for realizing regulating optical properties to realize excellent image displays. The anti-dazzling laminate is utilized for preventing a lowering in visibility as a result of external light reflection or image reflection within image display devices. The anti-dazzling laminate is generally realized by forming an anti-dazzling layer having a concavoconvex shape on a base material. In conventional image display devices, for example, liquid crystal displays, the use of an anti-dazzling laminate as one anti-reflection laminate has hitherto been known for regulating optical properties to realize excellent image display. The anti-dazzling laminate is utilized for preventing a lowering in visibility as a result of external light reflection or image reflection within image display devices. The anti-dazzling laminate is produced as having a concavoconvex shape obtained by curing a composition containing various particles, or having a concavoconvex shape formed by embossing (Japanese Patent Laid-Open No. 341070/2004).

In recent years, a demand for a higher level of definition of panel resolution has led to a higher level of fineness of the concavoconcex shape of the anti-dazzling layer. Accordingly, a concavoconvex shape having a broad and large curve has been regarded as unsuitable for meeting a demand for higher definition in the anti-dazzling laminate having the above construction and thus have not been adopted. On the other hand, when increasing the fineness of the concavoconvex shape involved in higher definition of panel resolution can meet a demand for higher definition of the panel resolution. Regarding this technique, however, it has often been pointed out that, for example, external light is reflected from the display surface resulting in such a phenomenon that, for example, the image display surface is seen white (whitening), or lowered contrast. When the anti-dazzling laminate is used on the image display surface of notebook computers and the like, a certain level of satisfactory optical properties can be provided. When the light transmitted through the backside of backlight within a display is transmitted through the concavoconvex shape face of the anti-dazzling laminate formed on the outermost surface of the panel, however, the concavoconvex shape functions as fine lenses which disturb the displayed pixels and the like, that is, "glare" is likely to occur. This unfavorable phenomenon makes it difficult to attain the effect of the anti-dazzling laminate per se. In particular, the occurrence of the "glare" increases with increasing the definition of the panel resolution, and, thus, effectively preventing this unfavorable phenomenon has been desired.

In order to eliminate this "glare," for example, a method has been adopted in which surface concavoconvexes are densely provided to enhance the sharpness and, at the same time, scattering particles different from the resin for anti-dazzling layer formation in refractive index are added to, for example, impart internal scattering effect to the anti-dazzling laminate. All of proposed methods could satisfactorily solve the problem of the "glare," but on the other hand, they sometimes lowered the visibility of the whole image. On the other hand, in the anti-dazzling laminate, the method for preventing the "glare" in high-definition panels has been regarded as a main cause of an unfavorable phenomenon, for example, a deterioration in contrast such as clouding caused by surface whitening, internal scattering effect or the like. That is, it has been regarded that "glare prevention" and "contrast improvement" are in the relationship of tradeoff, and simultaneously meeting both the requirements is difficult. In the above methods, for example, black color reproduction including glossy black feeling (wet glossy black color) in on-screen display, contrast and the like have sometimes been poor. That is, gradation rendering of black color in a light room, particularly a black color gradation difference in low gradation, cannot be regarded without difficulties resulting in lowered sensitivity. Specifically, black and gray colors are only recognized as a blurred and identical color-tone black color. In particular, it can be said that an anti-dazzling laminate having better anti-glare properties has a significantly lowered level of visibility.

Accordingly, at the present time, the development of an optical laminate, which can effectively prevent the glare of an image surface and, at the same time, can realize good black color reproduction, especially glossy black feeling, has been desired. In particular, an optical laminate, which can be used in liquid crystal displays (LCDs) as well as in other applications such as cathode ray tube display devices (CRTs), plasma displays (PDPs), fluorescent display tubes, and field emission-type displays, has been eagerly desired.

SUMMARY OF THE INVENTION

At the time of the present invention, the present inventors found that it is possible to provide an optical laminate which, while imparting anti-dazzling properties, can realize the so-called glossy black feeling by improving the anti-glare property and the contrast, especially improving black color reproduction. The present invention has been made based on such finding.

Accordingly, the present invention provides an optical laminate which can realize an anti-dazzling function and an excellent anti-glare property and, at the same time, can realize image display having a high level of visibility.

According to the present invention, there is provided an optical laminate comprising a light transparent base material and an anti-dazzling layer provided on the light transparent base material, wherein the outermost surface of the anti-dazzling layer has a concavoconvex shape, the anti-dazzling layer has been formed using a composition for an anti-dazzling layer, comprising a resin and fine particles, and the resin and the fine particles satisfy a requirement of n=not less than 0.05 and not more than 0.2 wherein n represents the difference in refractive index between the resin and the fine particles, and the concavoconvex shape of the anti-dazzling layer satisfies the following requirements:

Sm is not less than 100 μm and not more than 600 μm,

θa is not less than 0.1 degree and not more than 1.2 degrees, and

Rz is more than 0.2 μm and not more than 1 μm, wherein Sm represents the average spacing of concavoconvexes (or profile irregularities) in the anti-dazzling layer; θa represents the average inclination angle of the concavoconvexes (or profile irregularities); and Rz represents the average roughness of the concavoconvexes (or profile irregularities).

The optical laminate according to the present invention can realize excellent anti-dazzling properties and black color reproduction having glossy black feeling, can realize a high level of sharpness and excellent anti-glare property, contrast, and letter blurring preventive property, and can be used in various displays. In particular, the optical laminate according to the present invention can provide an optical laminate which is significantly improved in black color gradation rendering (glossy black color reproduction), which could not have been realized by the conventional anti-dazzling laminate without difficulties. More specifically, it is possible to provide an optical laminate which, in an image in movie display, can render gradation substantially comparable with a conventional display provided with a laminate comprising a clear hard coat layer free from any concavoconvex shape and an antireflection layer provided on the clear hard coat layer and, at the same time, can realize a good sharpness of the contour of letters and can prevent scintillation. In a preferred embodiment of the present invention, the provision of an optional layer such as a surface modifying layer or a low-refractive index layer on the anti-dazzling layer means that the surface of the concavoconvex shape constituting the anti-dazzling layer is sealed by the optional layer, and, thus, a large and smooth desired concavoconvex shape can be realized. Further, various functions such as antistatic property, refractive index regulation, and contamination prevention can be imparted to the optical laminate. When an optional layer such as a surface modifying layer or a low-refractive index layer is provided on the anti-dazzling layer, the surface concavoconvex shape of the optional layer such as the surface modifying layer or the low-refractive index layer conforms to the optical property values of the surface concavoconvex shape of the anti-dazzling layer according to the present invention. That is, in the optical laminate according to the present invention, the concavoconvex shape of the outermost surface conforms to the optical property values of the surface concavoconvex shape of the anti-dazzling layer specified in the present invention.

DETAILED DESCRIPTION OF THE INVENTION

Definitions

Figure 1:
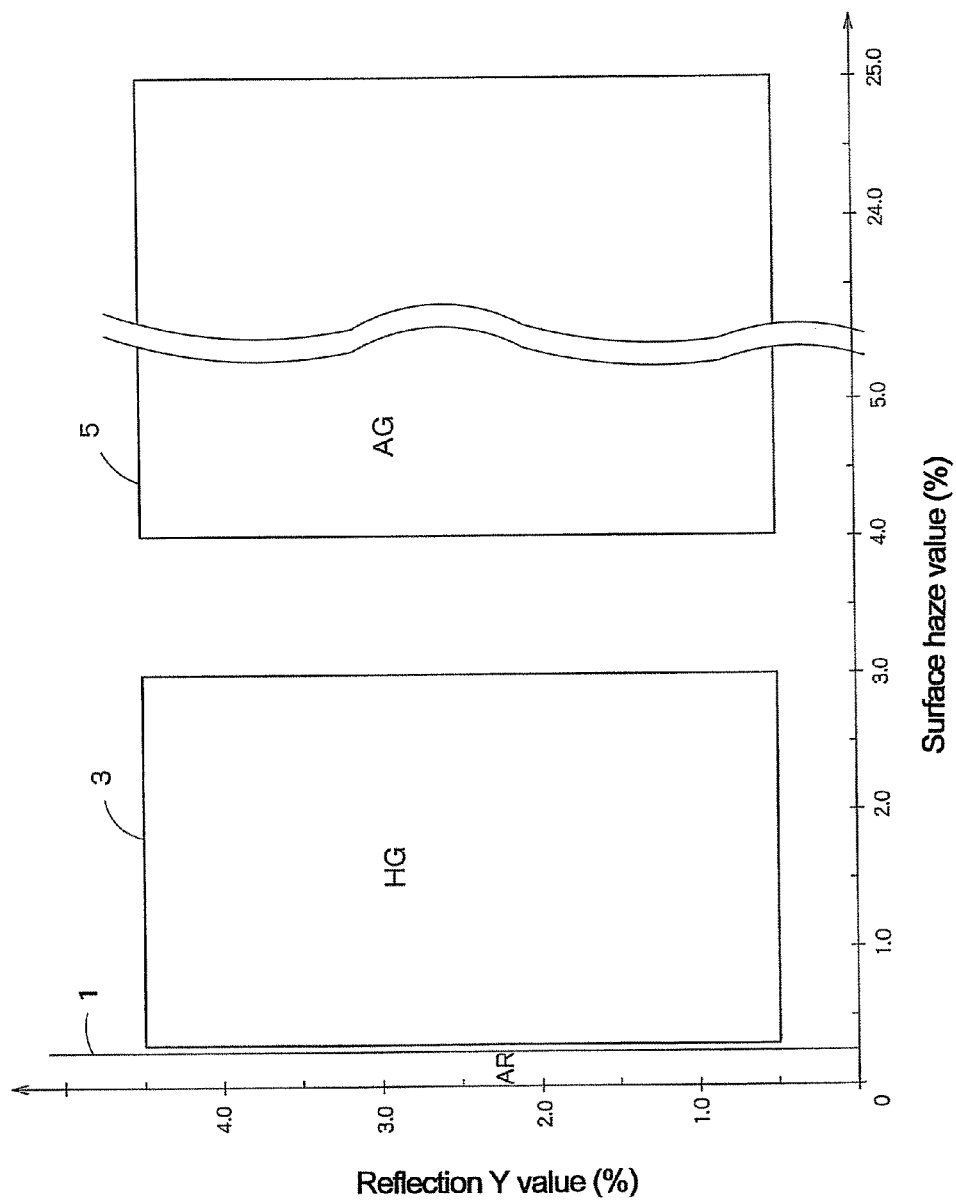
FIG. 1 is a graph showing the relationship between the reflection Y value and the surface haze value for an optical laminate.

Terms used in the present specification (working examples and the like) will be defined as follows.

1) Ten-point Average Roughness (Rz)

The average roughness is measured by measuring the surface shape as a two-dimensional or three-dimensional profile. In fact, the measurement in this case is carried out under a scanning probe microscope or an atomic force microscope. It is generally difficult to objectively compare curves per se, and, hence, various roughness indexes are calculated based on the profile curve data. Accordingly, in the present invention, the ten-point average roughness (Rz) is calculated using the above measurement results and is expressed in terms of the sum of the average value of absolute values of the highest five deviation values and the average value of absolute values of the lowest five deviation values among deviation values determined from average values.

2) Average Spacing of Concavoconvexes (Profile Irregularities) Sm (μm) and Average Inclination Angle θa The anti-dazzling layer constituting the optical laminate according to the present invention has a concavoconvex shape. Sm (μm) represents the average spacing of concavoconvexes (profile irregularities) of the anti-dazzling layer, and θa (degree) represents the average inclination angle of the concavoconvex part. Sm (μm) and θa (degree) may be defined as described in an instruction manual (revised on Jul. 20, 1995) of a surface roughness measuring device (model: SE-3400, manufactured by Kosaka Laboratory Ltd.). θa (degree) represents the angle mode, and, when the inclination is Δa in terms of aspect ratio, θa (degree) is determined by θa (degree)=1/tan Δa=1/(sum of values of difference between the lowest part and the highest part in each concavoconvex (corresponding to the height of each convex part)/reference length). The "reference length" is the same as in the following measuring conditions 1.

When the parameters (Sm, θa, and Rz) representing the surface roughness of the optical laminate according to the present invention may be measured, for example, with the above surface roughness measuring device under the following measurement conditions. This measuring method is favorable in the present invention.

Measuring Conditions

1) Tracer in Surface Roughness Detector:

Model/SE2555N (standard 2 μm), manufactured by Kosaka Laboratory Ltd. (radius of curvature in tip 2 μm/apex angle: 90 degrees/material: diamond)

2) Measuring Conditions for Surface Roughness Measuring Device:

Reference length (cut-off value of roughness curve λc): 2.5 mm

Evaluation length (reference length (cut-off value λc)×5): 12.5 mm

Feed speed of tracer: 0.5 mm/sec

ψ=Rz/Sm

The ratio ψ between the average roughness Rz of concavoconvexes and the average spacing Sm of concavoconvexes is defined by ψ≡Rz/Sm. The ratio between the average roughness Rz of concavoconvexes and the average spacing Sm of concavoconvexes can be used as an index for indicating the gradient of the inclination of the concavoconvexes. The ratio ψ between the average roughness Rz of concavoconvexes and the average spacing Sm of concavoconvexes is defined by ψ≡Rz/Sm. The ratio between the average roughness Rz of concavoconvexes and the average spacing Sm of concavoconvexes can be used as an index for indicating the tilt angle of the inclination of the concavoconvexes.

3) Reflection Y Value

The reflection Y value is a value indicating a luminous reflectance determined by measuring 5-degree regular reflectance in a wavelength range of 380 to 780 nm with a spectrophotometer MPC 3100 manufactured by Shimadzu Seisakusho Ltd. and then converting the reflectance values to lightness which can be perceived by the human eye with a software (incorporated in MPC 3100). The 5-degree regular reflectance is measured in such a state that, in order to prevent the backside reflection of the film as the optical laminate, a black tape (manufactured by Teraoka Seisakusho Co., Ltd.) is applied to the side remote from the film face to be measured.

4) Haze Value, Total Light Transmittance, 60-degree Gloss, and Transmission Sharpness The haze value may be measured according to JIS K 7136. A reflection-transmittance meter HR-100 (Murakami Color Research Laboratory) may be mentioned as an instrument used for the measurement. The total light transmittance of the anti-dazzling laminate may be measured with the same measuring device as in the haze value according to JIS K 7361. The haze and total light transmittance are measured in such a state that the coated face is directed to a light source. The 60-degree gloss can be measured with a precision gloss meter (GM-26D, manufactured by Murakami Color Research Laboratory) according to JIS Z 8741. The 60-degree gloss is measured in such a state that, in order to eliminate the influence of backside reflection of a sample, a double face adhesive tape (manufactured by Teraoka Seisakusho Co., Ltd.) is applied to the backside of a sample and a black lid of the measuring device. The transmission sharpness is expressed in terms of the total of numerical values obtained by measurement with four types of optical combs (0.125 mm, 0.5 mm, 1 mm, and 2 mm) with an image clarity measuring device (stock number; "ICM-1DP", manufactured by Suga Test Instruments Co., Ltd.) according to JIS K 7105.

5) Definition of Surface Haze

The term "surface haze" as used herein is determined as follows. A pentaerythritol triacrylate or other resin (including resin components such as monomers or oligomers) is diluted with toluene or the like to a solid content of 60%, and the diluted solution is coated with a wire bar onto concavoconvexes of the anti-dazzling layer to a thickness on a dry film basis of 8 μm, whereby the surface concavoconvexes of the anti-dazzling layer are rendered flat. In this case, when the recoating agent is likely to be repelled and less likely to wet the anti-dazzling layer due to the presence of a leveling agent in the composition for anti-dazzling layer formation, a method may be adopted in which the anti-dazzling film is previously rendered hydrophilic by saponification. The saponification is carried out by immersing the anti-dazzling film in a 2 mol/liter NaOH (or KOH) solution (55° C.) for 3 min, washing the film with water, completely removing water droplets with a Kimwipe, and then drying the film in an oven (50° C.) for one min. The film having a flattened surface does not have any haze derived from surface concavoconvexes but has only an internal haze. This haze can be determined as an internal haze. The value obtained by subtracting the internal haze from the original film haze (overall haze) is determined as a haze (a surface haze) attributable only to surface concavoconvexes.

6) Thickness of Anti-dazzling Layer

The thickness of the anti-dazzling layer refers to a part extended from the interface, between the base material on its display surface side and the outermost surface of the anti-dazzling concavoconvex in contact with the air. In the part extended from the base material surface to the outermost surface, the anti-dazzling layer has either a single layer or a multilayer structure comprising a surface modifying layer and other optical function layers stacked onto the anti-dazzling layer.

Method for Measuring Layer Thickness

The cross section of the optical laminate was subjected to transmission observation under a confocal laser microscope (LeicaTCS-NT, manufactured by Leica: magnification "100 to 300 times) to determine whether or not the interface was present, and the results were evaluated according to the following criteria. Specifically, in order to provide a halation-free sharp image, a wet objective lens was used in a confocal laser microscope, and about 2 ml of an oil having a refractive index of 1.518 was placed on an optical laminate, followed by observation to determine the presence or absence of the interface. The oil was used to allow the air layer between the objective lens and the optical laminate to disappear.

Measurement Procedure

1: The average thickness of the layer was measured by observation under a laser microscope.

2: The measurement was carried out under the following conditions.

3: For one image plane, the layer thickness from the base material to the maximum profile peak (convex) part was measured for one point, and the layer thickness from the base material to the minimum valley (concave) part was measured for one point. That is, the layer thickness was measured for two points in total for one image plane. This measurement was carried out for five image planes, that is, 10 points in total, and the average value was determined.

Optical Laminate

The optical laminate according to the present invention simultaneously has anti-dazzling properties and excellent black color reproduction and contrast. In the present invention, the optical laminate is referred to as a half glare optical laminate (HG). HG has both properties of a conventional anti-glare optical laminate (AG) having excellent anti-dazzling properties and properties of a conventional optical laminate (AR) comprising a clear hard coat (glare) layer provided with a low-refractive index layer and having excellent black color reproduction and contrast. Specifically, the provision of a surface modifying layer considered as one of methods for half glare optical laminate (HG) formation on the anti-glare optical laminate (AG) renders the concavoconvex shape of the anti-dazzling layer smooth, and, further, imparting a surface roughness parameter similar to the anti-glare (AG) can realize the production of an anti-dazzling laminate having a very high level of glossy black feeling while imparting satisfactory anti-dazzling properties. Accordingly, the details of the optical laminate (HG) according to the present invention will be described while comparing the conventional AR and AG.

FIG. 1 is a diagram showing the relationship between the surface haze value (%) and the reflection Y value (%) in the optical laminate. In FIG. 1, the conventional AR belongs to an area in which the surface haze value is less than about 0.3%, specifically an area on the left side from the ruled line indicated by a reference numeral 1. On the other hand, the conventional AG has been utilized in an area where the surface haze value is approximately 4.0% to 25.0% (generally not less than 10.0%) and the reflection Y value is approximately 1.0 to 4.5, specifically an area surrounded by a reference numeral 5 (generally a right side area in the area surrounded by the reference numeral 5). On the other hand, the optical laminate (HG) according to the present invention belongs to an area where the surface haze value is approximately not less than 0.2% and not more than 3.5% (preferably not more than 3.0) and the reflection Y value is approximately not less than 0.5 and not more than 4.5, specifically an area surrounded by a reference numeral 3.

Figure 2:
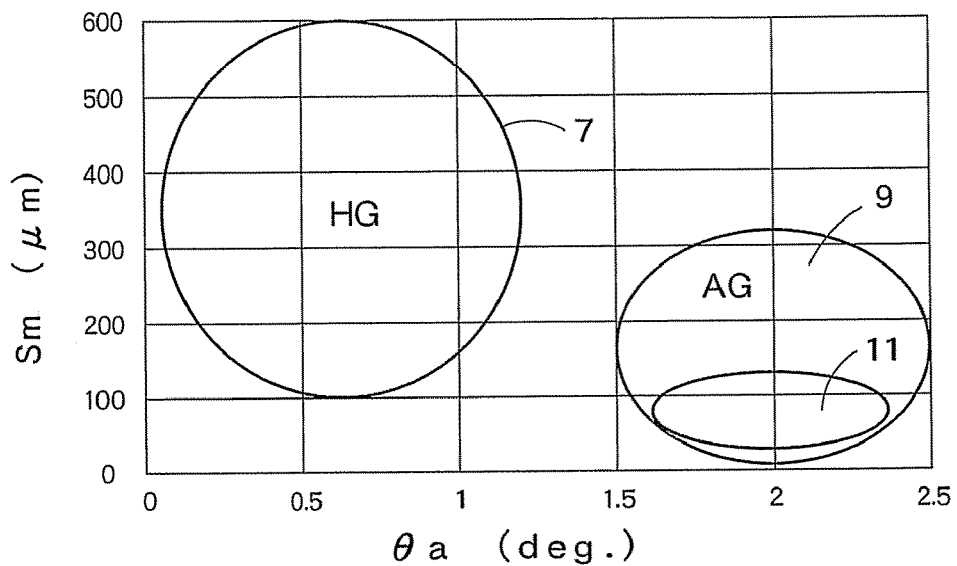
FIG. 2 is a graph showing the relationship between θa and Sm for an optical laminate.

The optical properties of the optical laminate according to the present invention will be described with reference to FIG. 2. FIG. 2 is a diagram showing the relationship between the average inclination angle θa (in degree) in the concavoconvexes part of the anti-dazzling layer in the optical laminate and the average spacing Sm (μm) of the concavoconvexes. As can be seen from FIG. 2, in the conventional AG, specifically, AG having a θa value of not less than 1.5 degrees and not more than 2.5 degrees and an Sm value of approximately more than 30 μm and not more than 300 μm (an area indicated by a reference numeral 9), that is, one falling within the area indicated by a reference numeral 11, has been regarded as a preferred AG. On the other hand, in the optical laminate (HG) according to the present invention, the θa value is more than 0.1 degree and not more than 1.2 degrees. Preferably, the lower limit of the θa value is 0.3 degree, and the upper limit of the θa value is 0.6 degree. The Sm value is approximately not less than 100 μm and not more than 600 μm. Preferably, the lower limit of the Sm value is 120 μm, and the upper limit of the Sm value is 400 μm. Specifically, an optical laminate falling within an area indicated by a reference numeral 7 is utilized. The Rz value of the optical laminate according to the present invention is more than 0.2 μm (preferably not less than 0.35 μm) and not more than 1.2 μm (preferably not more than 1 μm, more preferably not more than 0.9 μm).

Layer Construction

Figure 3:
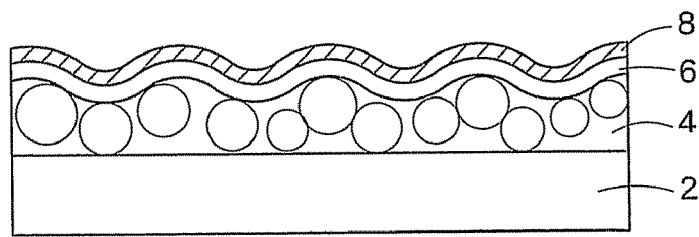
FIG. 3 is a schematic cross-sectional view of an optical laminate according to the present invention.

The optical laminate (HG) according to the present invention will be described with reference to FIG. 3. FIG. 3 is a cross-sectional view of the optical laminate according to the present invention. An anti-dazzling layer 4 is provided on the upper surface of a light transparent base material 2, and the anti-dazzling layer 4 comprises a resin and fine particles. In a preferred embodiment of the present invention, a surface modifying layer 6 is provided on the upper part of the anti-dazzling layer 4. In an optical laminate in a more preferred embodiment of the present invention, a low-refractive index layer 8 having a lower refractive index than the anti-dazzling layer 4 or surface modifying layer 6 is provided on the surface of the surface modifying layer 6.

1. Anti-dazzling Layer

In the present invention, an anti-dazzling layer is provided on the light transparent base material. In the present invention, an anti-dazzling layer having a concavoconvex shape is formed on the surface of the light transparent base material using a composition for an anti-dazzling layer, comprising fine particles added to a resin. The thickness H μm of the anti-dazzling layer is preferably not less than 0.5 μm and not more than 27 μm (preferable not more than 16 μm). Preferably, the lower limit of the layer thickness H μm is 2 μm, and the upper limit of the layer thickness H μm is 23 μm (more preferably 12 μm).

Refractive Index Difference n/Internal Haze

In the present invention, the difference n in refractive index between the resin and the fine particles is not less than 0.05 and not more than 0.20. Preferably, the lower limit of the refractive index difference n is 0.07, more preferably 0.09, and the upper limit of the refractive index difference n is 0.18, more preferably 0.12. When the difference n in refractive index between the resin and the fine particles falls within the above-defined range, the internal haze of the optical laminate can be imparted and uneven image in LCDs and the like and scintillation (seen by the eye as twinkling flicker) caused upon the passage of light such as backlight transmitted through the optical laminate from its backside can be effectively prevented. When the realization of such properties as the optical laminate is contemplated, preferably the difference n in refractive index between the resin and the fine particles falls within the above-defined range.

In the present invention, the internal haze value is not less than 0.1 and not more than 55. Preferably, the lower limit of the internal haze value is 5.0, and the upper limit of the internal haze value is 40.

On the other hand, in another preferred embodiment of the present invention, the difference n in refractive index between the resin and the fine particles is not less than 0 and not more than 0.05. The lower limit of the refractive index difference n is preferably 0.001, more preferably 0.005, and the upper limit of the refractive index difference n is preferably 0.03, more preferably 0.01. When the difference n in refractive index between the resin and the fine particles is in the above-defined range, a high contrast and a low haze value can be realized. When the realization of such properties as the optical laminate, preferably, the difference n in refractive index between the resin and the fine particles is in the above-defined range.

In the present invention, the difference in refractive index between the resin and the fine particles is defined in the above two range levels. This is not technically contradictory, because the above two range levels are necessary for realizing desired optical properties as the optical laminate, particularly on which the laminate of the present invention is mounted, for realizing optical properties optimal for modes in individual liquid crystal, PDP, CRT or other panels.

Fine Particles

The fine particles may be in a spherical, for example, truly spherical, or elliptical form, preferably in a truly spherical form. The fine particles may be aggregation-type fine particles. In the present invention, the average particle diameter R (μm) of the fine particles is not less than 1.0 μm and not more than 20 μm. Preferably, the upper limit of the average particle diameter is 15.0 μm, more preferably 13.5 μm, and the lower limit of the average particle diameter is 3.0 μm, more preferably 3.5 μm (still more preferably 4.0 μm). When the average particle diameter R of the fine particles is in the above-defined range, advantageously, a proper concavoconvex shape can be formed, and a preferred thickness range can be realized in the anti-dazzling layer.

In the present invention, preferably not less than 80% (preferably not less than 90%) of the whole fine particles is accounted for by fine particles having an average particle diameter distribution of R±1.0 μm, preferably R±0.5 μm, more preferably R±0.3 μm. When the average particle diameter distribution of the fine particles falls within the above-defined range, the evenness of the concavoconvex shape of the anti-dazzling laminate can be rendered good and, at the same time, scintillation and the like can be effectively prevented. Further, the anti-dazzling layer may further comprise, in addition to the fine particles, second fine particles or third fine particles or a combination of a plurality of types of fine particles different from the fine particles in average particle diameter. For example, for small fine particles of which the average particle diameter R (μm) is approximately the lower limit value, i.e., about 3.5 μm, a concavoconvex layer can be efficiently formed using fine particles having a particle size distribution with the average particle diameter being 3.5 μm rather than monodisperse fine particles.

H−R

In a preferred embodiment of the present invention, the value obtained by subtracting the average particle diameter R μm of the fine particles from the thickness H μm of the anti-dazzling layer, "H−R," is not less than 0.3 μm and not more than 20 μm (preferably not more than 8.0 μm). Preferably, the lower limit of the "H−R" value is 0.5 μm, more preferably 1.0 μm, and the upper limit of the "H−R" value is 18 μm, more preferably 6.0 μm, still more preferably 4.5 μm. Here when a plurality of types of fine particles are used, "R" represents the maximum average particle diameter.

In a preferred embodiment of the present invention, the fine particles and the resin satisfy a requirement for the total weight ratio per unit area between the fine particles and the resin of m/M=not less than 0.01 and not more than 1.2 wherein m represents the total weight per unit area of the fine particles; and M represents the total weight of the resin per unit area. Preferably, the lower limit of the m/M value is 0.012, more preferably 0.015, and the upper limit of the m/M value is 1.0, more preferably 0.3.

Aggregation-type Fine Particles

In a preferred embodiment of the present invention, the use of aggregation-type fine particles among the fine particles is preferred. The aggregation-type fine particles may be identical fine particles, or alternatively may be a plurality of types of fine particles, the plurality of types being different from each other in average particle diameter. In a preferred embodiment of the present invention, the aggregation-type fine particles comprise first fine particles and second fine particles different from the first fine particles in average particle diameter. Further, in a more preferred embodiment of the present invention, the second fine particle as such or the aggregation part as such does not exhibit anti-dazzling properties in the anti-dazzling layer.

In the present invention, preferably, the fine particles satisfy the following formula:

0.25R (preferably 0.50)≦r≦1.0R (preferably 0.70)

wherein R represents the average particle diameter of the fine particles, μm; and r represents the average particle diameter of the second fine particles, μm.

When the r value is not less than 0.25R, the dispersion of the coating composition is easy and, consequently, the particles are not aggregated. In the step of drying after coating, a uniform concavoconvex shape can be formed without undergoing an influence of wind during floating. Further, when r is not more than 0.85R, advantageously, the function of the fine particles can be clearly distinguished from the function of the first fine particles.

In another embodiment of the present invention, preferably, the total weight ratio per unit area among the resin, fine particles, and second fine particles satisfies requirements represented by the following formula:

0.08≦($M_1$+$M_2$)/M≦0.36

0≦$M_2$≦4.0$M_1$ wherein $M_1$ represents the total weight of the fine particles per unit area; $M_2$ represents the total weight of the second fine particles per unit area; and M represents the total weight of the resin per unit area.

In another preferred embodiment of the present invention, preferably, a requirement represented by the following formula (IV) is satisfied:

Δn=|$n_1$−$n_3$|<0.15 and/or Δn=|$n_2$−$n_3$|<0.18 wherein $n_1$, $n_2$, and $n_3$ represent the refractive indexes of the fine particles, the second fine particles, and the resin, respectively.

Fine particles (second fine particles) may be of inorganic type and organic type and are preferably formed of an organic material. The fine particles exhibit anti-dazzling properties and are preferably transparent. Specific examples of such fine particles include plastic beads, and transparent plastic beads are more preferred. Specific examples of plastic beads include styrene beads (refractive index 1.59), melamine beads (refractive index 1.57), acrylic beads (refractive index 1.49), acryl-styrene beads (refractive index 1.54), polycarbonate beads, and polyethylene beads. In a preferred embodiment of the present invention, the plastic bead has a hydrophobic group on its surface, and, for example, styrenic beads are preferred.

Electroconductive agent (antistatic agent)

In a preferred embodiment of the present invention, the anti-dazzling layer contains an electroconductive agent (an antistatic agent). Dust adhesion to the surface of the optical laminate can be effectively prevented by adding an electroconductive agent. Specific examples of electroconductive agents (antistatic agents) include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metallic chelate moiety and are polymerizable upon exposure to ionizing radiations, or organometallic compounds such as functional group-containing coupling agents may also be used as the antistatic agent.

Further, electroconductive fine particles may be mentioned as the antistatic agent. Specific examples of electroconductive fine particles include fine particles of metal oxides. Such metal oxides include ZnO (refractive index 1.90; the numerical values within the parentheses being refractive index; the same shall apply hereinafter), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

Electroconductive polymers may be mentioned as the antistatic agent, and specific examples thereof include aliphatic conjugated polyacetylenes, aromatic conjugated poly(paraphenylenes), heterocyclic conjugated polypyrroles, polythiophenes, heteroatom-containing conjugated polyanilines, and mixture-type conjugated poly(phenylenevinylenes).

Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

Resin

The anti-dazzling layer according to the present invention may be formed from a (curing-type) resin. In the present invention, the "resin" is a concept including resin components such as monomers and oligomers. The curing-type resin is preferably transparent, and specific examples thereof are classified into ionizing radiation curing resins which are curable upon exposure to ultraviolet light or electron beams, mixtures of ionizing radiation curing resins with solvent drying resins, or heat curing resins. Preferred are ionizing radiation curing resins. In a preferred embodiment of the present invention, the resin comprises at least an ionizing radiation curing resin and a heat curing resin.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl (meth)acrylate, ethylhexyl (meth)acrylate, styrene, methyl styrene, and N-vinylpyrrolidone, and polyfunctional monomers, for example, polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When ionizing radiation curing resins are used as an ultraviolet curing resin, preferably, a photopolymerization initiator is used. Specific examples of photopolymerization initiators include acetophenones, benzophenones, Michler's benzoyl benzoate, α-amyloxime ester, tetramethyl thiuram monosulfide, and thioxanthones. Preferably, photosensitizers are mixed in the system. Specific examples of photosensitizers include n-butylamine, triethylamine, and poly-n-butylphosphine.

The solvent drying-type resin used as a mixture with the ionizing radiation curing resin is mainly a thermoplastic resin. Commonly exemplified thermoplastic resins are usable. Coating defects of the coated face can be effectively prevented by adding the solvent drying-type resin. Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrenic resins, (meth)acrylic resins, alicyclic olefinic resins, polyester resins, and cellulose derivatives (for example, cellulose esters).

In a preferred embodiment of the present invention, when the light transparent base material is formed of a cellulosic resin such as triacetylcellulose "TAC," specific examples of preferred thermoplastic resins include cellulosic resins, for example, nitrocellulose, acetylcellulose, cellulose acetate propionate, and ethylhydroxyethylcellulose. When the cellulosic resin is used, the adhesion between the light transparent base material and the antistatic layer (if any) and transparency can be improved. In addition to the above-described cellulose derivatives such as acetylcellulose, nitrocellulose, acetylbutylcellulose, ethylcellulose, and methylcellulose, vinyl resins such as vinyl acetate and its copolymers, vinyl chloride and its copolymers, and vinylidene chloride and its copolymers, acetal resins such as polyvinylformal and polyvinylbutyral, acrylic resins such as acrylic resin and its copolymers and methacrylic resin and its copolymers, polystyrene resins, polyamide resins, and polycarbonate resins.

Specific examples of heat curing resin include phenolic resins, urea resins, diallyl phthalate resins, melamin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Leveling Agent

In a preferred embodiment of the present invention, preferably, a fluoro- or silicone-type or other leveling agent is added to the composition for an anti-dazzling layer. The composition for an anti-dazzling layer to which the leveling agent has been added, can effectively prevent the inhibition of curing by oxygen to the surface of the coating film during coating or drying and, at the same time, impart scratch resistant effect. Preferably, the leveling agent is utilized in film-shaped light transparent base materials (for example, triacetylcellulose) which should be resistant to heat.

Method for Anti-dazzling Layer Formation

The anti-dazzling layer may be formed by mixing fine particles or aggregation-type fine particles (preferably first fine particles and second fine particles) and the resin in proper solvents, for example, alcohols such as isopropyl alcohol, methanol, or ethanol; ketones such as methyl ethyl ketone (MEK), methyl isobutyl ketone (MIBK), or cyclohexanone; esters such as methyl acetate, ethyl acetate, or butyl acetate; halogenated hydrocarbons; aromatic hydrocarbons such as toluene or xylene; or mixture thereof, to prepare a composition for an anti-dazzling layer and then coating the composition onto a light transparent base material.

Methods usable for coating the composition for an anti-dazzling layer onto the light transparent base material include coating methods such as roll coating, Mayer bar coating, and gravure coating. Coating the composition for an anti-dazzling layer is followed by drying and ultraviolet curing. Specific examples of ultraviolet light sources include light sources, for example, ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators. The resin is cured, and the fine particles in the resin are fixed to form a desired concavoconvex shape on the outermost surface of the anti-dazzling layer.

2. Surface Modifying Layer

In the present invention, a surface modifying layer may be formed to regulate the concavoconvex surface of the anti-dazzling layer. In this case, the surface modifying layer is integrated the anti-dazzling layer to exhibit an anti-dazzling function. Accordingly, in the formation of the surface modifying layer, optical property values such as Sm, θa, and Rz as surface concavoconvex shape values fall within the scope of the present invention. Further, when the surface modifying layer is applied onto the anti-dazzling layer, the surface concavoconvex shape of the surface modifying layer is of course identical to the optical property values of the surface concavoconvex shape of the anti-dazzling layer in the present invention. The above matter can be understood from the following detailed description on the surface modifying layer and working examples.

In the surface modifying layer, fine concavoconvexes present along the concavoconvex shape on the scale of one-tenth or less of the concavo-convex scale (profile peak height of concavoconvexes and spacing between profile peaks) in the surface roughness in the concavoconvex shape of the anti-dazzling layer can be sealed for smoothing to form smooth concavoconvexes, or the spacing between profile peaks of the concavoconvexes and peak profile height, and the frequency (number) of the profile peaks can be regulated. The surface modifying layer can be formed, for example, for imparting antistatic properties, refractive index regulation, hardness enhancement, and contamination preventive properties. The thickness (on a cured state bases) of the surface modifying layer is not less than 0.5 μm and not more than 20 μm (preferably not more than 12 μm). Preferably, the lower limit of the thickness of the surface modifying layer is 3 μm, and the upper limit of the thickness of the surface modifying layer is 8 μm.

H'-R

In the present invention, when the surface modifying layer is formed on the anti-dazzling layer, the total thickness H' μm of the anti-dazzling layer and the surface modifying layer is not less than 4 μm and not more than 27 μm. Preferably, the lower limit of the total thickness is 7 μm, and the upper limit of the total thickness is 23 μm. In a preferred embodiment of the present invention, the value obtained by subtracting the average particle diameter R μm of the fine particles from the total thickness H' μm of the anti-dazzling layer and the surface modifying layer, that is, "H'-R," is not less than 0.3 μm and not more than 20 μm. Preferably, the lower limit of "H'-R" is 0.5 μm, more preferably 1.0 μm, and the upper limit of "H'-R" is 18 μm, more preferably 6 μm.

Surface Modifying Agent

One material or a mixture of two or more materials selected from the group consisting of antistatic agents, refractive index regulating agents, contamination preventive agents, water repellants, oil repellents, fingerprint adhesion preventive agents, curability enhancing agents, and hardness regulating agents (cushioning property imparting agents) may be mentioned as the surface modifying agent.

Antistatic agent (electroconductive agent)

When an antistatic agent is contained in the surface modifying layer, dust adhesion to the surface of the optical laminate can be effectively prevented. Specific examples of antistatic agents include cationic group-containing various cationic compounds such as quaternary ammonium salts, pyridinium salts, primary, secondary and tertiary amino groups, anionic group-containing anionic compounds such as sulfonic acid bases, sulfuric ester bases, phosphoric ester bases, and phosphonic acid bases, amphoteric compounds such as amino acid and aminosulfuric ester compounds, nonionic compounds such as amino alcohol, glycerin and polyethylene glycol compounds, organometallic compounds such as alkoxides of tin and titanium, and metal chelate compounds such as their acetylacetonate salts. Further, compounds produced by increasing the molecular weight of the above compounds may also be mentioned. Further, polymerizable compounds, for example, monomers or oligomers, which contain a tertiary amino group, a quaternary ammonium group, or a metallic chelate moiety and are polymerizable upon exposure to ionizing radiations, or organometallic compounds such as functional group-containing coupling agents may also be used as the antistatic agent.

Further, electroconductive ultrafine particles may be mentioned as the antistatic agent. Specific examples of electroconductive ultrafine particles include ultrafine particles of metal oxides. Such metal oxides include ZnO (refractive index 1.90; the numerical values within the parentheses being refractive index), $CeO_2$ (1.95), $Sb_2O_2$ (1.71), $SnO_2$ (1.997), indium tin oxide often abbreviated to "ITO" (1.95), $In_2O_3$ (2.00), $Al_2O_3$ (1.63), antimony-doped tin oxide (abbreviated to "ATO," 2.0), and aluminum-doped zinc oxide (abbreviated to "AZO," 2.0). The term "fine particles" refers to fine particles having a size of not more than 1 micrometer, that is, fine particles of submicron size, preferably fine particles having an average particle diameter of 0.1 nm to 0.1 μm.

Electroconductive polymers may be mentioned as the antistatic agent, and specific examples thereof include aliphatic conjugated polyacetylenes, aromatic conjugated poly(paraphenylenes), heterocyclic conjugated polypyrroles, polythiophenes, heteroatom-containing conjugated polyanilines, and mixture-type conjugated poly(phenylenevinylenes). Additional examples of electroconductive polymers include double-chain conjugated systems which are conjugated systems having a plurality of conjugated chains in the molecule thereof, and electroconductive composites which are polymers prepared by grafting or block-copolymerizing the above conjugated polymer chain onto a saturated polymer.

In a preferred embodiment of the present invention, the addition amount ratio of the resin to the antistatic agent contained in the surface modifying layer is not less than 5 and not more than 25. Preferably, the upper limit of the addition amount ratio is 20, and the lower limit of the addition amount ratio is 5.

Refractive Index Regulating Agent

The refractive index regulating agent may be added to the surface modifying layer to regulate the optical properties of the optical laminate. Examples of such refractive index regulating agents include low-refractive index agents, medium-refractive index agents, and high-refractive index agents.

1) Low-refractive Index Agent

The low-refractive index agent has a lower refractive index than the anti-dazzling layer. In a preferred embodiment of the present invention, the anti-dazzling layer has a refractive index of not less than 1.5, and the low-refractive index agent has a refractive index of less than 1.5, preferably not more than 1.45.

Specific examples of low-refractive index agents include silicone-containing vinylidene fluoride copolymers, and an example thereof is a composition comprising 100 parts by weight of a fluorine-containing copolymer and 80 to 150 parts by weight of an ethylenically unsaturated group-containing polymerizable compound. The fluorine-containing copolymer has a fluorine content of 60 to 70% by weight and is produced by copolymerizing a monomer composition comprising 30 to 90% by weight of vinylidene fluoride and 5 to 50% by weight of hexafluoropropylene.

A copolymer produced by copolymerizing a monomer composition containing vinylidene fluoride and hexafluoropropylene may be mentioned as the fluorine-containing copolymer. Regarding the proportion of each component in the monomer composition, the content of vinylidene fluoride is 30 to 90% by weight, preferably 40 to 80% by weight, particularly preferably 40 to 70% by weight, or the content of hexafluoropropylene is 5 to 50% by weight, preferably 10 to 50% by weight, particularly preferably 15 to 45% by weight. The monomer composition may further comprise 0 to 40% by weight, preferably 0 to 35% by weight, particularly preferably 10 to 30% by weight, of tetrafluoroethylene.

The monomer composition for producing the fluorine-containing copolymer may if necessary contain other comonomer component(s), for example, in an amount of not more than 20% by weight, preferably not more than 10% by weight. Specific examples of such comonomer components include fluorine atom-containing polymerizable monomers such as fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene, and α-trifluoromethacrylic acid.

The content of fluorine in the fluorine-containing copolymer produced from the monomer composition is preferably 60 to 70% by weight, more preferably 62 to 70% by weight, particularly preferably 64 to 68% by weight. When the fluorine content is in the above-defined range, the fluorine-containing copolymer has good solubility in solvents which will be described later. The incorporation of the fluorine-containing copolymer as a component can realize the formation of an optical laminate having excellent adhesion, a high level of transparency, a low refractive index, and excellent mechanical strength.

The molecular weight of the fluorine-containing copolymer is preferably 5,000 to 200,000, particularly preferably 10,000 to 100,000, in terms of number average molecular weight as determined using polystyrene as a standard. When the fluorine-containing copolymer having this molecular weight is used, the fluororesin composition has suitable viscosity and thus reliably has suitable coatability.

The refractive index of the fluorine-containing copolymer per se is preferably not more than 1.45, more preferably not more than 1.42, still more preferably not more than 1.40. When the refractive index is in the above defined range, the formed optical laminate has good antireflection effect.

The addition amount of the resin is 30 to 150 parts by weight, preferably 35 to 100 parts by weight, more preferably 40 to 70 parts by weight, based on 100 parts by weight of the fluorine-containing copolymer. The content of fluorine based on the total amount of the polymer forming component comprising the fluorine-containing copolymer and the resin is 30 to 55% by weight, preferably 35 to 50% by weight.

When the addition amount or the fluorine content is in the above-defined range, the surface modifying layer has good adhesion to the base material and has a low refractive index, whereby good antireflection effect can be attained.

In a preferred embodiment of the present invention, the utilization of "void-containing fine particles" as a low-refractive index agent is preferred. "Void-containing fine particles" can lower the refractive index while maintaining the layer strength of the surface modifying layer. In the present invention, the term "void-containing fine particle" refers to a fine particle which has a structure comprising air filled into the inside of the fine particle and/or an air-containing porous structure and has such a property that the refractive index is lowered in reverse proportion to the proportion of air which occupies the fine particle as compared with the refractive index of the original fine particle. Further, such a fine particle which can form a nanoporous structure in at least a part of the inside and/or surface of the coating film by utilizing the form, structure, aggregated state, and dispersed state of the fine particle within the coating film, is also embraced in the present invention.

Specific examples of preferred void-containing inorganic fine particles are silica fine particles prepared by a technique disclosed in Japanese Patent Laid-Open No. 233611/2001. The void-containing silica fine particles can easily produced. Further, the hardness of the void-containing fine particles is high. Therefore, when a surface modifying layer is formed by using a mixture of the void-containing silica fine particles with a binder, the layer has improved strength and, at the same time, the refractive index can be regulated to a range of approximately 1.20 to 1.45. Hollow polymer fine particles produced by using a technique disclosed in Japanese Patent Laid-Open No. 80503/2002 are a specific example of preferred void-containing organic fine particles.

Fine particles which can form a nanoporous structure in at least a part of the inside and/or surface of the coating film include, in addition to the above silica fine particles, sustained release materials, which have been produced for increasing the specific surface area and adsorb various chemical substances on a packing column and the porous part of the surface, porous fine particles used for catalyst fixation purposes, or dispersions or aggregates of hollow fine particles to be incorporated in heat insulating materials or low-dielectric materials. Specific examples of such fine particles include commercially available products, for example, aggregates of porous silica fine particles selected from tradename Nipsil and tradename Nipgel manufactured by Nippon Silica Industrial Co., Ltd. and colloidal silica UP series (tradename), manufactured by Nissan Chemical Industries Ltd., having such a structure that silica fine particles have been connected to one another in a chain form, and fine particles in a preferred particle diameter range specified in the present invention may be selected from the above fine particles.

The average particle diameter of the "void-containing fine particles" is not less than 5 nm and not more than 300 nm. Preferably, the lower limit of the average particle diameter is 8 nm, and the upper limit of the average particle diameter is 100 nm. More preferably, the lower limit of the average particle diameter is 10 nm, and the upper limit of the average particle diameter is 80 nm. When the average diameter of the fine particles is in the above-defined range, excellent transparency can be imparted to the surface modifying layer.

2) High-refractive Index Agent/Medium-refractive Index Agent

The high-refractive index agent and the medium-refractive index agent may be added to the surface modifying layer to further improve antireflective properties. The refractive index of the high-refractive index agent and medium-refractive index agent may be set in a range of 1.46 to 2.00. The medium-refractive index agent has a refractive index in the range of 1.46 to 1.80, and the refractive index of the high-refractive index agent is in the range of 1.65 to 2.00.

These refractive index agents include fine particles, and specific examples thereof (the numerical value within the parentheses being a refractive index) include zinc oxide (1.90), titania (2.3 to 2.7), ceria (1.95), tin-doped indium oxide (1.95), antimony-doped tin oxide (1.80), yttria (1.87), and zirconia (2.0).

Leveling Agent

A leveling agent may be added to the surface modifying layer. Preferred leveling agents include fluorine-type or silicone-type leveling agents. The surface modifying layer to which the leveling agent has been added can realize a good coated face, can effectively prevent the inhibition of curing of the coating film surface by oxygen in coating or drying, and can impart a scratch resistance.

Contamination Preventive Agent

A contamination preventive agent may be added to the surface modifying layer. The contamination preventive agent is mainly used to prevent the contamination of the outermost surface of the optical laminate and can impart scratch resistance to the optical laminate. Specific examples of effective contamination preventive agents include additives which can develop water repellency, oil repellency, and fingerprint wiping-off properties. More specific examples of contamination preventive agents include fluorocompounds and silicon compounds or mixtures of these compounds. More specific examples thereof include fluoroalkyl group-containing silane coupling agents such as 2-perfluorooctylethyltriaminosilane. Among them, amino group-containing compounds are particularly preferred.

Resin

The surface modifying layer may comprise at least a surface modifying agent and a resin (including a resin component such as a monomer and an oligomer). When the surface modifying layer does not contain a surface modifying agent, the resin functions as a curability enhancing agent or functions to render the concavoconvexes of the anti-dazzling layer smooth. The resin is preferably transparent, and specific examples thereof are classified into ionizing radiation curing resins which are curable upon exposure to ultraviolet light or electron beams, mixtures of ionizing radiation curing resins with solvent drying-type resins, or heat curing resins. Preferred are ionizing radiation curing resins.

Specific examples of ionizing radiation curing resins include those containing an acrylate-type functional group, for example, oligomers or prepolymers and reactive diluents, for example, relatively low-molecular weight polyester resins, polyether resins, acrylic resins, epoxy resins, urethane resins, alkyd resins, spiroacetal resins, polybutadiene resins, and polythiol polyene resins and (meth)acrylates of polyfunctional compounds such as polyhydric alcohols. Specific examples thereof include monofunctional monomers such as ethyl (meth)acrylate, ethylhexyl (meth)acrylate, styrene, methyl styrene, and N-vinylpyrrolidone, and polyfunctional monomers, for example, polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When the ionizing radiation curing resin is an ultraviolet curing resin, a photopolymerization initiator is preferably used. Specific examples of photopolymerization initiators include acetophenones, benzophenones, Michler's benzoyl benzoate, α-amyloxime ester, and thioxanthones. Preferably, photosensitizers are mixed in the system. Specific examples of photosensitizers include n-butylamine, triethylamine, and poly-n-butylphosphine.

When ionizing radiation curing resins are used as an ultraviolet curing resin, a photopolymerization initiator or a photopolymerization accelerator may be added. In the case of a radical polymerizable unsaturated group-containing resin system, acetophenones, benzophenones, thioxanthones, benzoins, benzoin methyl ether and the like are used as a photopolymerization initiator either solely or as a mixture of two or more. On the other hand, in the case of a cation polymerizable functional group-containing resin system, aromatic diazonium salts, aromatic sulfonium salts, aromatic idonium salts, metallocene compounds, benzoinsulfonic esters and the like may be used as a photopolymerization initiator either solely or as a mixture of two or more. The amount of the photopolymerization initiator added is 0.1 to 10 parts by weight based on 100 parts by weight of the ionizing radiation curing composition.

The solvent drying-type resin used as a mixture with the ionizing radiation curing resin is mainly a thermoplastic resin. Commonly exemplified thermoplastic resins are usable. Specific examples of preferred thermoplastic resins include styrenic resins, (meth)acrylic resins, vinyl acetate resins, vinyl ether resins, halogen-containing resins, alicyclic olefinic resins, polycarbonate resins, polyester resins, polyamide resins, cellulose derivatives, silicone resins, and rubbers or elastomers. The resin is generally noncrystalline and, at the same time, is soluble in an organic solvent (particularly a common solvent which can dissolve a plurality of polymers and curable compounds). Particularly preferred are resins having good moldability or film forming properties, transparency, and weathering resistance, for example, styrenic resins, (meth)acrylic resins, alicyclic olefinic resins, polyester resins, cellulose derivatives (for example, cellulose esters).

The coating film defect of the coated face can be effectively prevented by adding a solvent drying-type resin. In a preferred embodiment of the present invention, when the light transparent base material is formed of a cellulosic resin such as triacetylcellulose "TAC," examples of preferred thermoplastic resins include cellulosic resins, for example, nitrocellulose, acetylcellulose, cellulose acetate propionate, and ethyl hydroxyethylcellulose.

Specific examples of heat curing resin include phenolic resins, urea resins, diallyl phthalate resins, melanin resins, guanamine resins, unsaturated polyester resins, polyurethane resins, epoxy resins, aminoalkyd resins, melamine-urea cocondensed resins, silicone resins, and polysiloxane resins. When the heat curing resin is used, if necessary, for example, curing agents such as crosslinking agents and polymerization initiators, polymerization accelerators, solvents, and viscosity modifiers may be further added.

Polymerization Initiator

In the formation of a surface modifying layer, photopolymerization initiators may be used. Specific examples thereof include 1-hydroxy-cyclohexyl-phenyl-ketone. This compound is commercially available, and examples of commercially available products include Irgacure 184 (tradename, manufactured by Ciba Specialty Chemicals, K.K.).

Solvent

A composition for a surface modifying layer comprising the above components mixed with the solvent is utilized for surface modifying layer formation. Specific examples of solvents usable herein include alcohols such as isopropyl alcohol, methanol, and ethanol; ketones such as methyl ethyl ketone, methyl isobutyl ketone, and cyclohexanone; esters such as methyl acetate, ethyl acetate, and butyl acetate; halogenated hydrocarbons; aromatic hydrocarbons such as toluene and xylene; or mixture thereof. Preferred are ketones and esters.

Method for Surface Modifying Layer Formation

The surface modifying layer may be formed by applying a composition for a surface modifying layer onto the anti-dazzling layer. The composition for a surface modifying layer may be formed by coating methods such as roll coating, Mayor bar coating, or gravure coating. After coating of the composition for a surface modifying layer, the coating is dried and cured by ultraviolet light irradiation. Specific examples of ultraviolet light sources include ultra-high-pressure mercury lamps, high-pressure mercury lamps, low-pressure mercury lamps, carbon arc lamps, black light fluorescent lamps, and metal halide lamps. Regarding the wavelength of the ultraviolet light, a wavelength range of 190 to 380 nm may be used. Specific examples of electron beam sources include various electron beam accelerators, for example, Cockcroft-Walton accelerators, van de Graaff accelerators, resonance transformer accelerators, insulated core transformer accelerators, linear accelerators, Dynamitron accelerators, and high-frequency accelerators.

4. Optional Layers

The optical laminate according to the present invention comprises a light transparent base material, an anti-dazzling layer, and an optional surface modifying layer. Optional layers such as an antistatic layer, a low-refractive index layer, and a contamination preventive layer may be further provided. As described above, in the optical laminate according to the present invention provided with the antistatic layer, the low-refractive index layer, and the contamination preventive layer, the concavoconvex shape of the outermost surface of the optical laminate provided with the optional layer(s) of course conforms to the optical property values of the concavoconvex shape of the surface of the anti-dazzling layer according to the present invention. The low-refractive index layer preferably has a lower refractive index than the refractive index of the anti-dazzling layer or surface modifying layer. The antistatic layer, low-refractive index layer, and contamination preventive layer may be formed by using a composition prepared by mixing a resin and the like with an antistatic agent, a low-refractive index agent, a contamination preventive agent or the like as described above in connection with the surface modifying layer. Accordingly, the antistatic agent, low-refractive index agent, contamination preventive agent, resin and the like may be the same as those used in the formation of the surface modifying layer.

5. Light Transparent Base Material

The light transparent base material is preferably smooth and possesses excellent heat resistance and mechanical strength. Specific examples of materials usable for the light transparent base material formation include thermoplastic resins, for example, polyesters (polyethylene terephthalate and polyethylene naphthalate), cellulose triacetate, cellulose diacetate, cellulose acetatebutyrate, polyamide, polyimide, polyethersulfone, polysulfone, polypropylene, polymethylpentene, polyvinyl chloride, polyvinylacetal, polyether ketone, polymethyl methacrylate, polycarbonate, and polyurethane. Preferred are polyesters (polyethylene terephthalate and polyethylene naphthalate) and cellulose triacetate.

Films of amorphous olefin polymers (cycloolefin polymers: COPs) having an alicyclic structure may also be mentioned as other examples of the light transparent base material. These films are base materials using nobornene polymers, monocyclic olefinic polymers, cyclic conjugated diene polymers, vinyl alicyclic hydrocarbon polymer resins and the like, and examples thereof include Zeonex and ZEONOR, manufactured by Zeon Corporation (norbornene resins), Sumilight FS-1700 manufactured by Sumitomo Bakelite Co., Ltd., ARTON (modified norbornene resin) manufactured by SR Corporation, APL (cyclic olefin copolymer) manufactured by Mitsui Chemicals Inc., Topas (cyclic olefin copolymer) manufactured by Ticona, and Optlet OZ-1000 series (alicyclic acrylic resins) manufactured by Hitachi Chemical Co., Ltd. Further, FV series (low birefringent index and low photoelastic films) manufactured by Asahi Kasei Chemicals Corporation are also preferred as base materials alternative to triacetylcellulose.

In the present invention, preferably, these thermoplastic resins are used as a highly flexible thin film. Depending upon the form of use where curability are required, plate-like materials such as plates of these thermoplastic resins or glass plates are also usable.

The thickness of the light transparent base material is not less than 20 μm and not more than 300 μm. Preferably, the upper limit of the thickness is 200 μm, and the lower limit of the thickness is 30 μm. When the light transparent base material is a plate-like material, the thickness may be above the upper limit of the above-defined thickness range. In forming an anti-dazzling layer on the light transparent base material, the base material may be previously subjected to physical treatment such as corona discharge treatment or oxidation treatment or may be previously coated with an anchoring agent or a coating material known as a primer from the viewpoint of improving the adhesion.

Utilization of Optical Laminate

The optical laminate produced by the process according to the present invention may be used in the following applications.

Polarizing Plate

In another embodiment of the present invention, there is provided a polarizing plate comprising a polarizing element and the optical laminate according to the present invention. More specifically, there is provided a polarizing plate comprising a polarizing element and the optical laminate according to the present invention provided on the surface of the polarizing element, the optical laminate being provided so that the surface of the optical laminate remote from the anti-dazzling layer faces the surface of the polarizing element.

The polarizing element may comprise, for example, polyvinyl alcohol films, polyvinylformal films, polyvinylacetal films, and ethylene-vinyl acetate copolymer-type saponified films, which have been dyed with iodine or a dye and stretched. In the lamination treatment, preferably, the light transparent base material (preferably a triacetylcellulose film) is saponified from the viewpoint of increasing the adhesion or antistatic purposes.

Image Display Device

In a further embodiment of the present invention, there is provided an image display device. The image display device comprises a transmission display and a light source device for applying light to the transmission display from its back side. The optical laminate according to the present invention or the polarizing plate according to the present invention is provided on the surface of the transmission display. The image display device according to the present invention may basically comprise a light source device (backlight), a display element, and the optical laminate according to the present invention. The image display device is utilized in transmission display devices, particularly in displays of televisions, computers, word processors and the like. Among others, the image display device is used on the surface of displays for high-definition images such as CRTs and liquid crystal panels.

When the image display device according to the present invention is a liquid crystal display device, light emitted from the light source device is applied through the lower side of the optical laminate according to the present invention. In STN-type liquid crystal display devices, a phase difference plate may be inserted into between the liquid crystal display element and the polarizing plate. If necessary, an adhesive layer may be provided between individual layers in the liquid crystal display device.

EXAMPLES

The following embodiments further illustrate the present invention. However, it should be noted that the contents of the present invention are not limited by these embodiments. The "parts" and "%" are by mass unless otherwise specified.

Compositions for respective layers constituting an optical laminate were prepared according to the following formulations. The formulations are summarized in Table 1.

Preparation of Composition for Anti-dazzling Layer

The particle size distribution of monodisperse fine particles incorporated in the preparation of compositions for an anti-dazzling layer was average particle diameter ±0.3 to ±1 μm for all cases. In this case, however, this is not true of the case where the particle diameter was not more than 3.5 μm.

Composition 1 for Anti-dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 5.0 μm, refractive index 1.535) as light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 1 for an anti-dazzling layer.

Composition 2 for Anti-dazzling Layer

Composition 2 for an anti-dazzling layer was prepared in the same manner as in the composition 1 for an anti-dazzling layer, except that the light transparent fine particles were changed to monodisperse acrylic beads having a particle diameter of 9.5 μm (manufactured by Nippon Shokubai Kagaku Kogyo Co., Ltd., refractive index 1.53).

Composition 3 for Anti-dazzling Layer

Composition 3 for an anti-dazzling layer was prepared in the same manner as in the composition 1 for an anti-dazzling layer, except that the light transparent fine particles were changed to monodisperse acrylic beads having a particle diameter of 13.5 μm (manufactured by Nippon Shokubai Kagaku Kogyo Co., Ltd., refractive index 1.53).

Composition 4 for Anti-dazzling Layer

Pentaerythritol triacrylate (PETA) (manufactured by Nippon Kayaku Co., Ltd., refractive index 1.51) (21.08 parts by mass) as an ultraviolet curing resin, 10.33 parts by mass of DPHA (manufactured by Nippon Kayaku Co., Ltd., refractive index 1.51) as an ultraviolet curing resin, 3.24 parts by mass of an acrylic polymer (manufactured by Mitsubishi Rayon Co., Ltd., molecular weight 75,000) as an ultraviolet curing resin, 2.02 parts by mass of Irgacure 184 (manufactured by Ciba-Geigy Limited) as a photocuring initiator, 0.34 part by mass of Irgacure 907 (manufactured by Ciba-Geigy Limited) as a photocuring initiator, 3.47 parts by mass of monodisperse acrylic beads (manufactured by Nippon Shokubai Kagaku Kogyo Co., Ltd., particle diameter 13.5 μm, refractive index 1.535) as light transparent fine particles, 0.014 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 4 for an anti-dazzling layer.

Composition 5 for Anti-dazzling Layer

Pentaerythritol triacrylate (PETA) (manufactured by Nippon Kayaku Co., Ltd., refractive index 1.51) (21.88 parts by mass) as an ultraviolet curing resin, 12.03 parts by mass of DPHA (manufactured by Nippon Kayaku Co., Ltd., refractive index 1.51) as an ultraviolet curing resin, 3.46 parts by mass of an acrylic polymer (manufactured by Mitsubishi Rayon Co., Ltd., molecular weight 75,000) as an ultraviolet curing resin, 2.19 parts by mass of Irgacure 184 (manufactured by Ciba-Geigy Limited) as a photocuring initiator, 0.37 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 9.5 μm, refractive index 1.535) as light transparent fine particles, 0.015 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 5 for an anti-dazzling layer.

Composition 6 for Anti-dazzling Layer

Composition 6 for an anti-dazzling layer was prepared in the same manner as in the composition 1 for an anti-dazzling layer, except that the light transparent fine particles were changed to acrylic beads having a particle diameter of 5.0 μm (manufactured by Nippon Shokubai Kagaku Kogyo Co., Ltd., refractive index 1.535).

Composition 7 for Anti-dazzling Layer

Pentaerythritol triacrylate (PETA) (manufactured by Nippon Kayaku Co., Ltd., refractive index 1.51) (20.28 parts by mass) as an ultraviolet curing resin, 8.62 parts by mass of DPHA (manufactured by Nippon Kayaku Co., Ltd., refractive index 1.51) as an ultraviolet curing resin, 3.03 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 4.80 parts by mass of monodisperse acrylic beads (manufactured by Nippon Shokubai Kagaku Kogyo Co., Ltd., particle diameter 9.5 μm, refractive index 1.535) as first light transparent fine particles, 1.59 parts by mass of monodisperse acrylic beads (manufactured by Nippon Shokubai Kagaku Kogyo Co., Ltd., particle diameter 9.5 μm, refractive index 1.53) as second light transparent fine particles, 0.013 part by mass of a silicone leveling agent 10-28 (manufactured by The Inctec Inc.), 47.60 parts by mass of toluene, and 11.90 parts by mass of cyclohexanone were thoroughly mixed together to prepare a composition. This composition was filtered through a polypropylene filter having a pore diameter of 30 μm to prepare composition 7 for an anti-dazzling layer.

Composition 8 for Anti-dazzling Layer

Pentaerythritol triacrylate (PETA) (manufactured by Nippon Kayaku Co., Ltd., refractive index 1.51) (21.61 parts by mass) as an ultraviolet curing resin, 9.28 parts by mass of DPHA (manufactured by Nippon Kayaku Co., Ltd., refractive index 1.51) as an ultraviolet curing resin, 2.61 parts by mass of an acrylic polymer (manufactured by Mitsubishi Rayon Co., Ltd., molecular weight 75,000) as an ultraviolet curing resin, 0.65 part by mass of a styrene-acrylic polymer (manufactured by The Inctec Inc., molecular weight 65,000), 2.02 parts by mass of Irgacure 184 (manufactured by Ciba-Geigy Limited) as a photocuring initiator, 0.34 part by mass of Irgacure 907 (manufactured by Ciba-Geigy Limited) as a photocuring initiator, 5.47 parts by mass of acrylic beads (manufactured by Nippon Shokubai Kagaku Kogyo Co., Ltd., particle diameter 1.9 μm, refractive index 1.535) as first light transparent fine particles, 0.014 part by mass of a silicone leveling agent 10-28 (manufactured by The Inctec Inc.), 46.40 parts by mass of toluene, and 11.60 parts by mass of cyclohexanone were thoroughly mixed together to prepare a composition. In this case, second light transparent fine particles were not used. This composition was filtered through a polypropylene filter having a pore diameter of 30 μm to prepare composition 8 for an anti-dazzling layer.

Composition 9 for Anti-dazzling Layer

Pentaerythritol triacrylate (PETA) (manufactured by Nippon Kayaku Co., Ltd., refractive index 1.51) (20.82 parts by mass) as an ultraviolet curing resin, 7.72 parts by mass of DPHA (manufactured by Nippon Kayaku Co., Ltd., refractive index 1.51) as an ultraviolet curing resin, 3.06 parts by mass of an acrylic polymer (manufactured by Mitsubishi Rayon Co., Ltd., molecular weight 75,000) as an ultraviolet curing resin, 1.86 parts by mass of Irgacure 184 (manufactured by Ciba-Geigy Limited) as a photocuring initiator, 0.31 part by mass of Irgacure 907 (manufactured by Ciba-Geigy Limited) as a photocuring initiator, 8.21 parts by mass of acrylic beads (manufactured by Nippon Shokubai Kagaku Kogyo Co., Ltd., particle diameter 4.6 μm, refractive index 1.535) as first light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. In this case, second light transparent fine particles were not used. This composition was filtered through a polypropylene filter having a pore diameter of 30 μm to prepare composition 9 for an anti-dazzling layer.

Composition 10 for Anti-dazzling Layer

Pentaerythritol triacrylate (PETA) (manufactured by Nippon Kayaku Co., Ltd., refractive index 1.51) (21.28 parts by mass) as an ultraviolet curing resin, 8.63 parts by mass of DPHA (manufactured by Nippon Kayaku Co., Ltd., refractive index 1.51) as an ultraviolet curing resin, 3.18 parts by mass of an acrylic polymer (manufactured by Mitsubishi Rayon Co., Ltd., molecular weight 75,000) as an ultraviolet curing resin, 1.96 parts by mass of Irgacure 184 (manufactured by Ciba-Geigy Limited) as a photocuring initiator, 0.33 part by mass of Irgacure 907 (manufactured by Ciba-Geigy Limited) as a photocuring initiator, 4.96 parts by mass of acrylic beads (manufactured by Nippon Shokubai Kagaku Kogyo Co., Ltd., particle diameter 4.6 μm, refractive index 1.53) as first light transparent fine particles, 1.65 parts by mass of acrylic beads (manufactured by Nippon Shokubai Kagaku Kogyo Co., Ltd., particle diameter 3.5 μm, refractive index 1.535) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 μm to prepare composition 10 for an anti-dazzling layer.

Composition 11 for Anti-dazzling Layer

Pentaerythritol triacrylate (PETA) (manufactured by Nippon Kayaku Co., Ltd., refractive index 1.51) (21.28 parts by mass) as an ultraviolet curing resin, 8.63 parts by mass of DPHA (manufactured by Nippon Kayaku Co., Ltd., refractive index 1.51) as an ultraviolet curing resin, 3.02 parts by mass of an acrylic polymer (manufactured by Mitsubishi Rayon Co., Ltd., molecular weight 75,000) as an ultraviolet curing resin, 0.16 part by mass of a styrene-acrylic polymer (manufactured by The Inctec Inc., molecular weight 65,000), 1.96 parts by mass of Irgacure 184 (manufactured by Ciba-Geigy Limited) as a photocuring initiator, 0.33 part by mass of Irgacure 907 (manufactured by Ciba-Geigy Limited) as a photocuring initiator, 5.62 parts by mass of acrylic beads (manufactured by Nippon Shokubai Kagaku Kogyo Co., Ltd., particle diameter 3.5 μm, refractive index 1.535) as first light transparent fine particles, 0.99 part by mass of acrylic beads (manufactured by Nippon Shokubai Kagaku Kogyo Co., Ltd., particle diameter 3.5 μm, refractive index 1.52) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 μm to prepare composition 11 for an anti-dazzling layer.

Composition 12 for Anti-dazzling Layer

Pentaerythritol triacrylate (PETA) (manufactured by Nippon Kayaku Co., Ltd., refractive index 1.51) (20.96 parts by mass) as an ultraviolet curing resin, 8.02 parts by mass of DPHA (manufactured by Nippon Kayaku Co., Ltd., refractive index 1.51) as an ultraviolet curing resin, 3.10 parts by mass of an acrylic polymer (manufactured by Mitsubishi Rayon Co., Ltd., molecular weight 75,000) as an ultraviolet curing resin, 1.89 parts by mass of Irgacure 184 (manufactured by Ciba-Geigy Limited) as a photocuring initiator, 0.32 part by mass of Irgacure 907 (manufactured by Ciba-Geigy Limited) as a photocuring initiator, 4.81 parts by mass of styrene beads (manufactured by Soken Chemical Engineering Co., Ltd., particle diameter 5.0 μm, refractive index 1.53) as first light transparent fine particles, 2.89 parts by mass of melamine beads (manufactured by Nippon Shokubai Kagaku Kogyo Co., Ltd., particle diameter 1.8 μm, refractive index 1.68) as second light transparent fine particles, 0.013 part by mass of a silicone leveling agent 10-28 (manufactured by The Inctec Inc.), 46.40 parts by mass of toluene, and 11.60 parts by mass of cyclohexanone were thoroughly mixed together to prepare a composition. This composition was filtered through a polypropylene filter having a pore diameter of 30 μm to prepare composition 12 for an anti-dazzling layer.

Composition 13 for Anti-dazzling Layer

A zirconia-containing coating composition (manufactured by JSR, tradename; "KZ 7973", a resin matrix having a refractive index of 1.69) was provided. Composition 13 for an anti-dazzling layer was prepared according to the following formulation so that the resin matrix had a refractive index of 1.63.

Pentaerythritol triacrylate (PETA) (manufactured by Nippon Kayaku Co., Ltd., refractive index 1.51) (17.76 parts by mass) as an ultraviolet curing resin, 19.62 parts by mass of zirconia to be incorporated in the ultraviolet curing resin for developing the resin matrix (manufactured by JSR, zirconia contained in tradename; "KZ 7973," average particle diameter 40 to 60 nm, refractive index 2.0), 1.40 parts by mass of a zirconia dispersing agent (manufactured by JSR, a zirconia dispersion stabilizer also contained in tradename; "KZ 7973,"), 0.94 parts by mass of an acrylic polymer (manufactured by Mitsubishi Rayon Co., Ltd., molecular weight 40,000) as an ultraviolet curing resin, 1.21 parts by mass of Irgacure 184 (manufactured by Ciba-Geigy Limited) as a photocuring initiator, 0.20 part by mass of Irgacure 907 (manufactured by Ciba-Geigy Limited) as a photocuring initiator, 1.81 parts by mass of styrene beads (manufactured by Soken Chemical Engineering Co., Ltd., particle diameter 3.5 μm, refractive index 1.60) as first light transparent fine particles, 2.02 parts by mass of acrylic beads (manufactured by Soken Chemical Engineering Co., Ltd., particle diameter 1.5 µm, refractive index 1.49) as second light transparent fine particles, 0.030 part by mass of a silicone leveling agent 10-28 (manufactured by The Inctec Inc.), 41.76 parts by mass of toluene, 10.44 parts by mass of cyclohexanone, and 2.80 parts by mass of MEK were thoroughly mixed together to prepare a composition. This composition was filtered through a polypropylene filter having a pore diameter of 30 µm to prepare composition 13 for an anti-dazzling layer.

Composition 14 for Anti-dazzling Layer

Composition 14 for an anti-dazzling layer was prepared in the same manner as in composition 10 for an anti-dazzling layer, except that Bright GNR4.6-EH (gold-nickel coated resin beads; manufactured by The Nippon Chemical Industrial Co., Ltd.) as an electroconductive material (electroconductive particles) was added in an amount of 0.1% based on the total mass of the anti-dazzling layer.

Composition 15 for anti-dazzling layer

Composition 15 for an anti-dazzling layer was prepared in the same manner as in composition 4 for an anti-dazzling layer, except that an amorphous silica matting agent dispersed ink: EXG40-77 (Z-15M) (a dispersion liquid of amorphous silica having an average particle diameter of 2.5 µm in resin (PETE): manufactured by Dainichiseika Color & Chemicals Manufacturing Co., Ltd.), and, when the total resin amount in the total solid matter amount was presumed to be 100 parts by mass, the amount of the monodisperse acrylic beads (manufactured by Nippon Shokubai Kagaku Kogyo Co., Ltd., particle diameter 13.5 µm, refractive index 1.535) as light transparent fine particles and the amount of the amorphous silica were 10 parts by mass and 7.5 parts by mass, respectively.

Composition 16 for Anti-dazzling Layer

Pentaerythritol triacrylate (PETA) (manufactured by Nippon Kayaku Co., Ltd., refractive index 1.51) (15.24 parts by mass) as an ultraviolet curing resin, 8.64 parts by mass of DPHA (manufactured by Nippon Kayaku Co., Ltd., refractive index 1.51) as an ultraviolet curing resin, 2.34 parts by mass of an acrylic polymer (manufactured by Mitsubishi Rayon Co., Ltd., molecular weight 75,000) as an ultraviolet curing resin, 1.55 parts by mass of Irgacure 184 (manufactured by Ciba-Geigy Limited) as a photocuring initiator, 0.26 part by mass of Irgacure 907 (manufactured by Ciba-Geigy Limited) as a photocuring initiator, 12.90 parts by mass of monodisperse acrylic beads (manufactured by Nippon Shokubai Kagaku Kogyo Co., Ltd., particle diameter 7.0 µm, refractive index 1.535) as light transparent fine particles, 0.10 part by mass of a silicone leveling agent 10-28 (manufactured by The Inctec Inc.), 47.17 parts by mass of toluene, and 11.81 parts by mass of cyclohexanone were thoroughly mixed together to prepare a composition. This composition was filtered through a polypropylene filter having a pore diameter of 30 µm to prepare composition 16 for an anti-dazzling layer.

Composition 17 for Anti-dazzling Layer

Pentaerythritol triacrylate (PETA) (manufactured by Nippon Kayaku Co., Ltd., refractive index 1.51) (13.15 parts by mass) as an ultraviolet curing resin, 7.45 parts by mass of DPHA (manufactured by Nippon Kayaku Co., Ltd., refractive index 1.51) as an ultraviolet curing resin, 2.02 parts by mass of an acrylic polymer (manufactured by Mitsubishi Rayon Co., Ltd., molecular weight 75,000) as an ultraviolet curing resin, 1.33 parts by mass of Irgacure 184 (manufactured by Ciba-Geigy Limited) as a photocuring initiator, 0.22 part by mass of Irgacure 907 (manufactured by Ciba-Geigy Limited) as a photocuring initiator, 13.15 parts by mass of monodisperse acrylic beads (manufactured by Nippon Shokubai Kagaku Kogyo Co., Ltd., particle diameter 7.0 µm, refractive index 1.535) as light transparent fine particles, 0.08 part by mass of a silicone leveling agent 10-28 (manufactured by The Inctec Inc.), 47.23 parts by mass of toluene, and 11.83 parts by mass of cyclohexanone were thoroughly mixed together to prepare a composition. This composition was filtered through a polypropylene filter having a pore diameter of 30 µm to prepare composition 17 for an anti-dazzling layer.

Composition 18 for Anti-dazzling Layer

Pentaerythritol triacrylate (PETA) (manufactured by Nippon Kayaku Co., Ltd., refractive index 1.51) (11.56 parts by mass) as an ultraviolet curing resin, 6.55 parts by mass of DPHA (manufactured by Nippon Kayaku Co., Ltd., refractive index 1.51) as an ultraviolet curing resin, 1.78 parts by mass of an acrylic polymer (manufactured by Mitsubishi Rayon Co., Ltd., molecular weight 75,000) as an ultraviolet curing resin, 1.17 parts by mass of Irgacure 184 (manufactured by Ciba-Geigy Limited) as a photocuring initiator, 0.20 part by mass of Irgacure 907 (manufactured by Ciba-Geigy Limited) as a photocuring initiator, 6.39 parts by mass of monodisperse acrylic beads (manufactured by Nippon Shokubai Kagaku Kogyo Co., Ltd., particle diameter 7.0 µm, refractive index 1.535) as light transparent fine particles, 0.07 part by mass of a silicone leveling agent 10-28 (manufactured by The Inctec Inc.), 47.27 parts by mass of toluene, and 11.83 parts by mass of cyclohexanone were thoroughly mixed together to prepare a composition. This composition was filtered through a polypropylene filter having a pore diameter of 30 µm to prepare composition 18 for an anti-dazzling layer.

Composition 19 for Anti-dazzling Layer

Pentaerythritol triacrylate (PETA) (manufactured by Nippon Kayaku Co., Ltd., refractive index 1.51) (10.78 parts by mass) as an ultraviolet curing resin, 6.11 parts by mass of DPHA (manufactured by Nippon Kayaku Co., Ltd., refractive index 1.51) as an ultraviolet curing resin, 1.66 parts by mass of an acrylic polymer (manufactured by Mitsubishi Rayon Co., Ltd., molecular weight 75,000) as an ultraviolet curing resin, 1.09 parts by mass of Irgacure 184 (manufactured by Ciba-Geigy Limited) as a photocuring initiator, 0.18 part by mass of Irgacure 907 (manufactured by Ciba-Geigy Limited) as a photocuring initiator, 20.98 parts by mass of monodisperse acrylic beads (manufactured by Nippon Shokubai Kagaku Kogyo Co., Ltd., particle diameter 7.0 µm, refractive index 1.535) as light transparent fine particles, 0.07 part by mass of a silicone leveling agent 10-28 (manufactured by The Inctec Inc.), 47.29 parts by mass of toluene, and 11.84 parts by mass of cyclohexanone were thoroughly mixed together to prepare a composition. This composition was filtered through a polypropylene filter having a pore diameter of 30 µm to prepare composition 19 for an anti-dazzling layer.

Composition 20 for Anti-dazzling Layer

An amorphous silica-containing coating composition (manufactured by Dainichiseika Color & Chemicals Manufacturing Co., Ltd., tradename; "EXG40-77 (Z-15M)" (average particle diameter of amorphous silica: 2.5 µm) (3.3 g), 1.5 g of an ultraviolet curing resin composition (manufactured by Dainichiseika Color & Chemicals Manufacturing Co., Ltd., tradename; "EXG40-77 (S-2)"), 0.03 g of a silicone leveling agent 10-28 (manufactured by The Inctec Inc.), 3.3 g of toluene, and 1.1 g of MIBK were thoroughly mixed together to prepare a composition. This composition was filtered through a polypropylene filter having a pore diameter of 80 µm to prepare composition 20 for an anti-dazzling layer.

Composition 21 for Anti-dazzling Layer

An amorphous silica-containing coating composition (manufactured by Dainichiseika Color & Chemicals Manufacturing Co., Ltd., tradename; "EXG40-77 (D-30M)" (average particle diameter of amorphous silica: 1.5 μm) (3.5 g), 1.6 g of an ultraviolet curing resin composition (manufactured by Dainichiseika Color & Chemicals Manufacturing Co., Ltd., tradename; "EXG40-77 (S-2)"), 0.03 g of a silicone leveling agent 10-28 (manufactured by The Inctec Inc.), 3.3 g of toluene, and 1.2 g of MIBK were thoroughly mixed together to prepare a composition. This composition was filtered through a polypropylene filter having a pore diameter of 80 μm to prepare composition 21 for an anti-dazzling layer.

Composition 22 for Anti-dazzling Layer

Pentaerythritol triacrylate (PETA) (manufactured by Nippon Kayaku Co., Ltd., refractive index 1.51) (18.63 parts by mass) as an ultraviolet curing resin, 10.11 parts by mass of DPHA (manufactured by Nippon Kayaku Co., Ltd., refractive index 1.51) as an ultraviolet curing resin, 2.67 parts by mass of an acrylic polymer (manufactured by Mitsubishi Rayon Co., Ltd., molecular weight 75,000) as an ultraviolet curing resin, 2.06 parts by mass of Irgacure 184 (manufactured by Ciba-Geigy Limited) as a photopolymerization initiator, 0.296 part by mass of Irgacure 907 (manufactured by Ciba-Geigy Limited) as a photopolymerization initiator, 4.71 parts by mass of monodisperse acrylic beads (manufactured by Nippon Shokubai Kagaku Kogyo Co., Ltd., particle diameter 9.0 μm, refractive index 1.535) as light transparent fine particles, 2.01 parts by mass of monodisperse styrene beads (SX350H manufactured by Soken Chemical Engineering Co., Ltd., particle diameter 3.5 μm, refractive index 1.60), 0.013 part by mass of a silicone leveling agent 10-28 (manufactured by The Inctec Inc.), 46.80 parts by mass of toluene, and 12.58 parts by mass of cyclohexanone were thoroughly mixed together to prepare a composition.

This composition was filtered through a polypropylene filter having a pore diameter of 30 μm to prepare composition 22 for an anti-dazzling layer.

Composition 23 for Anti-dazzling Layer

Pentaerythritol triacrylate (PETA) (manufactured by Nippon Kayaku Co., Ltd., refractive index 1.51) (18.51 parts by mass) as an ultraviolet curing resin, 9.18 parts by mass of DPHA (manufactured by Nippon Kayaku Co., Ltd., refractive index 1.51) as an ultraviolet curing resin, 2.38 parts by mass of an acrylic polymer (manufactured by Mitsubishi Rayon Co., Ltd., molecular weight 75,000) as an ultraviolet curing resin, 2.24 parts by mass of Irgacure 184 (manufactured by Ciba-Geigy Limited) as a photopolymerization initiator, 0.258 part by mass of Irgacure 907 (manufactured by Ciba-Geigy Limited) as a photopolymerization initiator, 3.01 parts by mass of monodisperse acrylic beads (manufactured by Nippon Shokubai Kagaku Kogyo Co., Ltd., particle diameter 9.0 μm, refractive index 1.535) as light transparent fine particles, 4.91 parts by mass of monodisperse styrene beads (SX350H manufactured by Soken Chemical Engineering Co., Ltd., particle diameter 3.5 μm, refractive index 1.60), 0.012 part by mass of a silicone leveling agent 10-28 (manufactured by The Inctec Inc.), 48.66 parts by mass of toluene, and 10.74 parts by mass of cyclohexanone were thoroughly mixed together to prepare a composition. This composition was filtered through a polypropylene filter having a pore diameter of 30 μm to prepare composition 23 for an anti-dazzling layer.

Composition 24 for Anti-dazzling Layer

Pentaerythritol triacrylate (PETA) (manufactured by Nippon Kayaku Co., Ltd., refractive index 1.51) (18.08 parts by mass) as an ultraviolet curing resin, 7.94 parts by mass of DPHA (manufactured by Nippon Kayaku Co., Ltd., refractive index 1.51) as an ultraviolet curing resin, 1.95 parts by mass of an acrylic polymer (manufactured by Mitsubishi Rayon Co., Ltd., molecular weight 75,000) as an ultraviolet curing resin, 2.36 parts by mass of Irgacure 184 (manufactured by Ciba-Geigy Limited) as a photopolymerization initiator, 0.213 part by mass of Irgacure 907 (manufactured by Ciba-Geigy Limited) as a photopolymerization initiator, 2.77 parts by mass of monodisperse acrylic beads (manufactured by Nippon Shokubai Kagaku Kogyo Co., Ltd., particle diameter 9.0 μm, refractive index 1.535) as light transparent fine particles, 7.63 parts by mass of monodisperse styrene beads (SX350H manufactured by Soken Chemical Engineering Co., Ltd., particle diameter 3.5 μm, refractive index 1.60), 0.097 part by mass of a silicone leveling agent 10-28 (manufactured by The Inctec Inc.), 50.49 parts by mass of toluene, and 8.927 parts by mass of cyclohexanone were thoroughly mixed together to prepare a composition. This composition was filtered through a polypropylene filter having a pore diameter of 30 μm to prepare composition 24 for an anti-dazzling layer.

Composition 25 for Anti-dazzling Layer

Pentaerythritol triacrylate (PETA) (manufactured by Nippon Kayaku Co., Ltd., refractive index 1.51) (16.96 parts by mass) as an ultraviolet curing resin, 1.05 parts by mass of DPHA (manufactured by Nippon Kayaku Co., Ltd., refractive index 1.51) as an ultraviolet curing resin, 1.94 parts by mass of an acrylic polymer (manufactured by Mitsubishi Rayon Co., Ltd., molecular weight 75,000) as an ultraviolet curing resin, 1.59 parts by mass of Irgacure 184 (manufactured by Ciba-Geigy Limited) as a photopolymerization initiator, 0.264 part by mass of Irgacure 907 (manufactured by Ciba-Geigy Limited) as a photopolymerization initiator, 13.69 parts by mass of monodisperse acrylic beads (manufactured by Nippon Shokubai Kagaku Kogyo Co., Ltd., particle diameter 7.0 μm, refractive index 1.535) as light transparent fine particles, 0.096 part by mass of a silicone leveling agent 10-28 (manufactured by The Inctec Inc.), 45.94 parts by mass of toluene, and 13.47 parts by mass of cyclohexanone were thoroughly mixed together to prepare a composition. This composition was filtered through a polypropylene filter having a pore diameter of 30 μm to prepare composition 25 for an anti-dazzling layer.

Composition 26 for Anti-dazzling Layer

Composition 26 for an anti-dazzling layer was prepared in the same manner as in composition 23 for an anti-dazzling layer, except that an amorphous silica matting agent dispersed ink: EXG40-77 (Z-15M) (a dispersion liquid of amorphous silica having an average particle diameter of 2.5 μm in resin (PETE): manufactured by Dainichiseika Color & Chemicals Manufacturing Co., Ltd.), and, when the total resin amount in the total solid matter amount was presumed to be 100 parts by mass, the amount of the monodisperse acrylic beads (manufactured by Nippon Shokubai Kagaku Kogyo Co., Ltd., particle diameter 7.0 μm, refractive index 1.535) as light transparent fine particles, the amount of the monodisperse styrene beads (SX350H manufactured by Soken Chemical Engineering Co., Ltd., particle diameter 3.5 μm, refractive index 1.60), and the amount of the amorphous silica were 15 parts by mass, 16.5 parts by mass, and 3.5 parts by mass, respectively.

Preparation of Composition for Surface Modifying Layer

Composition 1 for Surface Modifying layer

DPHA (manufactured by Nippon Kayaku Co., Ltd., refractive index 1.51) (39.30 parts by mass) as an ultraviolet curing resin, 3.13 parts by mass of an acrylic polymer (manufactured by Mitsubishi Rayon Co., Ltd., molecular weight 40,000) as an ultraviolet curing resin, 2.12 parts by mass of Irgacure 184 (manufactured by Ciba-Geigy Limited) as a photocuring initiator, 0.43 part by mass of Irgacure 907 (manufactured by Ciba-Geigy Limited) as a photocuring initiator, 0.19 part by mass of a silicone leveling agent 10-28 (manufactured by The Inctec Inc.), 49.35 parts by mass of toluene, and 5.48 parts by mass of cyclohexanone were thoroughly mixed together to prepare a composition. This composition was filtered through a polypropylene filter having a pore diameter of 10 μm to prepare composition 1 for a surface modifying layer.

Composition 2 for Surface Modifying Layer

C-4456 S-7 (an ATO-containing electroconductive ink, average particle diameter of ATO 300 to 400 nm, solid content 45%, manufactured by NIPPON PELNOX CORP.) (21.6 g) as a material for an antistatic layer, 28.69 g of DPHA (manufactured by Nippon Kayaku Co., Ltd., refractive index 1.51) as an ultraviolet curing resin, 1.56 g of Irgacure 184 (manufactured by Ciba-Geigy Limited) as a photocuring initiator, 33.7 g of MIBK (methyl isobutyl ketone), and 14.4 g of cyclohexanone were thoroughly mixed together to prepare a composition. This composition was filtered through a polypropylene filter having a pore diameter of 30 μm to prepare composition 2 for a surface modifying layer.

Composition 3 for Surface Modifying Layer

Composition 3 for a surface modifying layer having the following formulation was prepared using a zirconia-containing coating composition (manufactured by JSR, tradename; "KZ 7973", a resin matrix having a refractive index of 1.69, solid content 50%) so that the resin matrix had a refractive index of 1.60.

Pentaerythritol triacrylate (PETA) (manufactured by Nippon Kayaku Co., Ltd., refractive index 1.51) (18.59 parts by mass) as an ultraviolet curing resin, 17.18 parts by mass of zirconia (manufactured by JSR, zirconia contained in "KZ 7973" (tradename), average particle diameter 40 to 60 nm, refractive index 2.0) for incorporation in an ultraviolet curing resin to develop a resin matrix, 1.22 parts by mass of a zirconia dispersant (manufactured by JSR, a zirconia dispersion stabilizer contained in "KZ 7973"(tradename)), 0.94 part by mass of an acrylic polymer (manufactured by Mitsubishi Rayon Co., Ltd., molecular weight 40,000) as an ultraviolet curing resin, 1.56 parts by mass of Irgacure 184 (manufactured by Ciba-Geigy Limited) as a photocuring initiator, 0.26 part by mass of Irgacure 907 (manufactured by Ciba-Geigy Limited) as a photocuring initiator, 0.039 part by mass of a silicone leveling agent 10-28 (manufactured by The Inctec Inc.), 14.34 parts by mass of toluene, 15.76 parts by mass of cyclohexanone, and 2.80 parts by mass of MEK were thoroughly mixed together to prepare a composition. This composition was filtered through a polypropylene filter having a pore diameter of 30 μm to prepare composition 3 for a surface modifying layer.

Preparation of Composition for Low-refractive Index Layer Composition 1 for Low-refractive Index Layer A photopolymerization initiator (tradename; "JUA701," manufactured by JSR) (0.85 g) and 65 g of MIBK were added to 34.14 g of a fluororesin composition (tradename; "TM086", manufactured by JSR), and the mixture was stirred and was filtered through a polypropylene filter having a pore diameter of 10 μm to prepare composition 1 for a low-refractive index layer.

Composition 2 for Low-refractive Index Layer

The following components were stirred according to the following formulation, and the mixture was filtered through a polypropylene filter having a pore diameter of 10 μm to prepare composition 2 for a low-refractive index layer.

| | |
|---|---|
| Surface treated silica sol (void-containing fine particles) (as 20% methyl isobutyl ketone solution) | 14.3 pts. wt. |
| Pentaerythritol triacrylate (PETA, refractive index 1.51, manufactured by Nippon Kayaku Co., Ltd.) | 1.95 pts. wt. |
| Irgacure 907 (manufactured by Ciba Specialty Chemicals, K.K.) | 0.1 pt. wt. |
| Polyether-modified silicone oil TSF4460 (tradename, manufactured by GE Toshiba Silicone Co., Ltd.) | 0.15 pt. wt. |
| Methyl isobutyl ketone | 83.5 pts. wt. |

Preparation of Composition for Antistatic Layer

C-4456 S-7 (an ATO-containing electroconductive ink, average particle diameter of ATO 300 to 400 nm, solid content 45%, manufactured by NIPPON PELNOX CORP.) (2.0 g) was provided as a material for an antistatic layer. Methyl isobutyl ketone (2.84 g) and 1.22 g of cyclohexanone were added to the material, and the mixture was stirred and was filtered through a polypropylene filter having a pore diameter of 30 μm to prepare composition for an antistatic layer.

Production of Optical Laminates

Optical laminates were produced as follows.

Example 1

Formation of Anti-dazzling Layer

An 80 μm-thick triacetylcellulose film (TD80U, manufactured by Fuji Photo Film Co., Ltd.) was provided as a transparent base material. Composition 1 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 5 μm-thick anti-dazzling hardcoat layer was formed. The light transparent fine particles were monodisperse acrylic beads having a particle diameter of 5.0 μm.

Formation of Surface Modifying Layer

The formed anti-dazzling layer was provided as a transparent base material. Composition 1 for a surface modifying layer was coated onto the transparent base material with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 μm-thick surface modifying layer was formed to produce an optical laminate (HG1).

Example 2

An optical laminate (HG2) was produced in the same manner as in Example 1, except that composition 2 for an anti-dazzling layer was used. The light transparent fine particles in composition 2 for an anti-dazzling layer were monodisperse acrylic beads having a particle diameter of 9.5 µm, and the surface modifying layer had a thickness of 4.0 µm.

Example 3

An optical laminate (HG3) was produced in the same manner as in Example 1, except that composition 3 for an anti-dazzling layer was used. The light transparent fine particles in composition 3 for an anti-dazzling layer were monodisperse acrylic beads having a particle diameter of 13.5 µm.

Example 4

An optical laminate was produced in the same manner as in Example 1, except that composition 4 for an anti-dazzling layer was used. The light transparent fine particles in composition 4 for an anti-dazzling layer were monodisperse acrylic beads having a particle diameter of 13.5 µm, and the proportion of the light transparent fine particles to the total weight of the solid content was 1/2 in the case of Example 3.

Example 5

An optical laminate was produced in the same manner as in Example 1, except that composition 5 for an anti-dazzling layer was used. The light transparent fine particles in composition 5 for an anti-dazzling layer were monodisperse acrylic beads having a particle diameter of 9.5 µm, and the proportion of the light transparent fine particles to the total weight of the solid content was 75/1000 in the case of Example 2.

Example 6

An optical laminate was produced in the same manner as in Example 1, except that composition 6 for an anti-dazzling layer was used. The light transparent fine particles in composition 6 for an anti-dazzling layer were acrylic beads having a particle size distribution of 5.0±2.0 µm.

Example 7

An optical laminate was produced in the same manner as in Example 1, except that composition 7 for an anti-dazzling layer was used. The light transparent fine particles in composition 7 for an anti-dazzling layer were monodisperse acrylic beads having a particle diameter of 9.5 µm, and the second light transparent fine particle were monodisperse acrylic beads having a particle diameter of 5.0 µm.

Example 8

An optical laminate was produced in the same manner as in Example 1, except that composition 4 for an anti-dazzling layer and composition 2 for a surface modifying layer were used. In order to form an electroconductive surface modifying layer, an ATO-containing composition was used in composition 2 for a surface modifying layer.

Example 9

Formation of antistatic layer

An 80 µm-thick triacetylcellulose film (TD80U, manufactured by Fuji Photo Film Co., Ltd.) was provided as a transparent base material. The composition for an antistatic layer was coated onto the transparent base material with a wire-wound rod for coating (Mayer's bar), and the coated transparent base material was heat dried in an oven of 50° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 1 µm-thick antistatic layer was formed.

Formation of Anti-dazzling Layer

Composition 4 for an anti-dazzling layer was coated onto the antistatic layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 30 mJ for half curing to cure the coating film. Thus, a 3 µm-thick anti-dazzling layer was formed.

Formation of Surface Modifying Layer

Composition 1 for a surface modifying layer was coated onto the anti-dazzling layer with a wire-wound rod for coating (Mayer's bar), and the coating was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 3 µm-thick surface modifying layer was formed to produce an optical laminate.

Example 10

The procedure of Example 1 was repeated, except that composition 4 for an anti-dazzling layer was used, and, in the formation of the surface modifying layer, ultraviolet light was applied at an exposure of 30 mJ for half curing to cure the coating film.

Formation of Low-refractive Index Layer

Composition 2 for a low-refractive index layer was coated onto the anti-dazzling layer with a wire-wound rod for coating (Mayer's bar), and the coating was heat dried in an oven of 50° C. for one min to evaporate the solvent component. Thereafter, under nitrogen purge (oxygen concentration: not more than 200 ppm), ultraviolet light was applied at an exposure of 150 mJ to cure the coating film. Thus, a 98 nm-thick low-refractive index layer was formed to produce an optical laminate.

Example 11

An optical laminate was produced in the same manner as in Example 1, except that composition 3 for a surface modifying layer and composition 1 for a low-refractive index layer were used. A zirconia-containing resin matrix was used in composition 3 for a surface modifying layer, and the refractive index of the surface modifying layer was regulated to 1.60.

Example 12

An 80 µm-thick triacetylcellulose film (TD80U, manufactured by Fuji Photo Film Co., Ltd.) was provided as a transparent base material. Composition 8 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film. Thus, a 6 μm-thick anti-dazzling layer was formed. Further, composition 1 for a surface modifying layer was coated on the anti-dazzling layer to produce an optical laminate. The first light transparent fine particles were acrylic beads having a small particle diameter, and the surface of the particles were hydrophilic. Accordingly, in order to form an aggregated part having a desired three-dimensional structure, a hydrophobic styrene acrylic polymer (molecular weight: 65,000) was added.

Example 13

An optical laminate was produced in the same manner as in Example 12, except that composition 9 for an anti-dazzling layer was used. In composition 9 for an anti-dazzling layer, the first light transparent fine particles were acrylic beads having a particle diameter of 4.6 μm of which the surface was hydrophobic (that is, the particles were dispersible in toluene and were aggregated in methanol).

Example 14

An optical laminate was produced in the same manner as in Example 12, except that composition 10 for an anti-dazzling layer was used. In composition 10 for an anti-dazzling layer, in order to form an aggregated part having a desired three-dimensional structure, the first light transparent fine particles and second light transparent fine particles were selected so that they were different from each other in particle diameter to constitute a mixed particle system composed of the first and second light transparent fine particles.

Example 15

An optical laminate was produced in the same manner as in Example 12, except that composition 11 for an anti-dazzling layer was used. In composition 11 for an anti-dazzling layer, in the same manner as in Example 14, the first light transparent fine particles and second light transparent fine particles were selected so as to constitute a mixed particle system composed of the first and second light transparent fine particles. In this case, the first light transparent fine particles and second light transparent fine particles were identical to each other in particle diameter (3.5 μm). Further, in order to form an aggregated part having a desired three-dimensional structure, the first light transparent fine particles were hydrophobic acrylic beads which were the same as those used in Example 2, and the second light transparent fine particles were hydrophilic acrylic beads which were likely to be aggregated in toluene and to be dispersed in methanol).

Example 16

An optical laminate was produced in the same manner as in Example 12, except that composition 12 for an anti-dazzling layer was used. In composition 12 for an anti-dazzling layer, in order to form an aggregated part having a desired three-dimensional structure in particles of a material other than acrylic beads, styrene beads were used as the first light transparent fine particles, and melamine beads were used as the second light transparent fine particles.

Example 17

An optical laminate was produced in the same manner as in Example 12, except that composition 13 for an anti-dazzling layer was used. In composition 13 for an anti-dazzling layer, in order to form an aggregated part having a desired three-dimensional structure in a resin matrix, styrene beads were used as the first light transparent fine particles in a zirconia-containing resin matrix (refractive index: 1.63), and acrylic beads were used as the second light transparent fine particles. The first light transparent fine particles and second light transparent fine particles were selected so that they were different from each other in particle diameter to constitute a mixed particle system composed of the first and second light transparent fine particles.

Example 18

An optical laminate of Example 18 was produced in the same manner as in Example 14, except that an antistatic layer (an AS layer) was formed on the transparent base material.

Formation of Anti-dazzling Laminate with Antistatic Layer

The composition for an anti-dazzling layer was coated on a triacetylcellulose to a thickness of 1.2 μm, and the coating was dried at 70° C. for one min. UV (ultraviolet) light was applied at an exposure of 54 mj under nitrogen purge for half curing. Next, composition 7 for an anti-dazzling layer was coated on the anti-static layer to a thickness of 6 μm, and the coating was dried at 70° C. for one min, followed by exposure to UV light at 100 mj under nitrogen purge to cure the coating.

Example 19

An optical laminate was produced in the same manner as in Example 1, except that composition 15 for an anti-dazzling layer was used. In the light transparent fine particles in composition 15 for an anti-dazzling layer, in the same manner as in Example 4, monodisperse acrylic beads having a size of 13.5 μm were added in the same proportion. Further, amorphous silica having an average particle diameter of 2.5 μm was added in an amount of 0.75 time the total weight of the monodisperse acrylic beads.

Example 20

An optical laminate was produced in the same manner as in Example 1, except that composition 16 for an anti-dazzling layer was used. Monodisperse acrylic beads having a size of 9.5 μm were used as the light transparent fine particles in composition 16 for an anti-dazzling layer, and the ratio of the amount of the light transparent fine particles to the total weight of the solid matter was brought to 50/100.

Example 21

An optical laminate was produced in the same manner as in Example 1, except that composition 17 for an anti-dazzling layer was used. Monodisperse acrylic beads having a size of 9.5 μm were used as the light transparent fine particles in composition 17 for an anti-dazzling layer, and the ratio of the amount of the light transparent fine particles to the total weight of the solid matter was brought to 75/100.

Example 22

An optical laminate was produced in the same manner as in Example 1, except that composition 18 for an anti-dazzling layer was used. Monodisperse acrylic beads having a size of 9.5 μm were used as the light transparent fine particles in composition 18 for an anti-dazzling layer, and the ratio of the amount of the light transparent fine particles to the total weight of the solid matter was brought to 100/100.

Example 23

An optical laminate was produced in the same manner as in Example 1, except that composition 19 for an anti-dazzling layer was used. Monodisperse acrylic beads having a size of 9.5 μm were used as the light transparent fine particles in composition 19 for an anti-dazzling layer, and the ratio of the amount of the light transparent fine particles to the total weight of the solid matter was brought to 115/100.

Example 24

An optical laminate was produced in the same manner as in Example 1, except that composition 22 for an anti-dazzling layer was used and the thickness of the surface modifying layer was brought to 6 μm. The use of fine particles which had a refractive index different from that of the binder resin by 0.09 could provide an internal diffusion effect and could realize more effective prevention of a twinkling flicker.

Example 25

An optical laminate was produced in the same manner as in Example 1, except that composition 23 for an anti-dazzling layer was used and the thickness of the surface modifying layer was brought to 6 μm. The use of fine particles which had a refractive index different from that of the binder resin by 0.09 could provide an internal diffusion effect and could realize more effective prevention of a twinkling flicker.

Example 26

An optical laminate was produced in the same manner as in Example 1, except that composition 24 for an anti-dazzling layer was used and the thickness of the surface modifying layer was brought to 6 μm. The use of fine particles which had a refractive index different from that of the binder resin by 0.09 could provide an internal diffusion effect and could realize more effective prevention of a twinkling flicker.

Example 27

An optical laminate was produced in the same manner as in Example 1, except that composition 25 for an anti-dazzling layer was used and the thickness of the surface modifying layer was brought to 9 μm. The use of fine particles which had a refractive index different from that of the binder resin by 0.09 could provide an internal diffusion effect and could realize more effective prevention of a twinkling flicker.

Example 28

An optical laminate was produced in the same manner as in Example 1, except that composition 26 for an anti-dazzling layer was used and the thickness of the surface modifying layer was brought to 5 μm. The use of fine particles which had a refractive index different from that of the binder resin by 0.09 could provide an internal diffusion effect and could realize more effective prevention of a twinkling flicker.

Comparative Example 1

A conventional anti-dazzling optical laminate (AG) was prepared as follows to produce an optical laminate (AG1). Specifically, an 80 μm-thick triacetylcellulose film (TD80U, manufactured by Fuji Photo Film Co., Ltd.) was provided as a transparent base material. Composition 16 for an anti-dazzling layer was coated onto the transparent base material with a wire-wound rod for coating (Mayer's bar), and the coated transparent base material was heat dried in an oven of 70° C. for one min to evaporate the solvent component. Thereafter, under nitrogen purge (oxygen concentration: not more than 200 ppm), ultraviolet light was applied at an exposure of 100 mJ to cure the coating film and thus to form a 3 μm-thick anti-dazzling hardcoat layer. Thus an optical laminate (AG1) was produced. AG1 is an anti-dazzling optical laminate (AG) using amorphous silica having an average particle diameter of 2.5 μm as the light transparent fine particles.

Comparative Example 2

A conventional anti-dazzling optical laminate (AG) was produced as follows to produce an optical laminate. The anti-dazzling optical laminate (AG) was produced in the same manner as in Comparative Example 1, except that composition 17 for an anti-dazzling layer was used and the amorphous silica used had an average particle diameter of 1.5 μm. The anti-dazzling optical laminate of Comparative Example 2 was also an anti-dazzling optical laminate (AG) using amorphous silica.

Comparative Example 3

In the same manner as in Example 1, an optical laminate having a layer thickness of 3.7 μm was produced, except that in the formation of the anti-dazzling layer, the size of the monodisperse acrylic beads in composition 1 for an anti-dazzling layer was change to 3.5 μm and no surface modifying layer was formed. The laminate thus formed had a small Sm value and could not prevent the occurrence of a twinkling flicker.

Comparative Example 4

In the same manner as in Example 1, an optical laminate was produced, except that in the formation of the anti-dazzling layer, the size of the monodisperse acrylic beads in composition 1 for an anti-dazzling layer was change to 5 μm and the thickness of the surface modifying layer was 21 μm. The laminate thus formed had a large Sm value and had deteriorated anti-dazzling properties.

Comparative Example 5

An anti-dazzling layer and a surface modifying layer were formed to produce an optical laminate in the same manner as in Example 1, except that, in composition 6 for an anti-dazzling layer, the monodisperse acrylic beads had a particle size distribution of 5±3.0 μm. In the laminate thus formed, the average particle size distribution was broad and, due to the influence of giant particles, the concavoconvex shape was not uniform. Consequently, the laminate had a deteriorated twinkling flicker preventive property.

Evaluation Test

Figure 4:
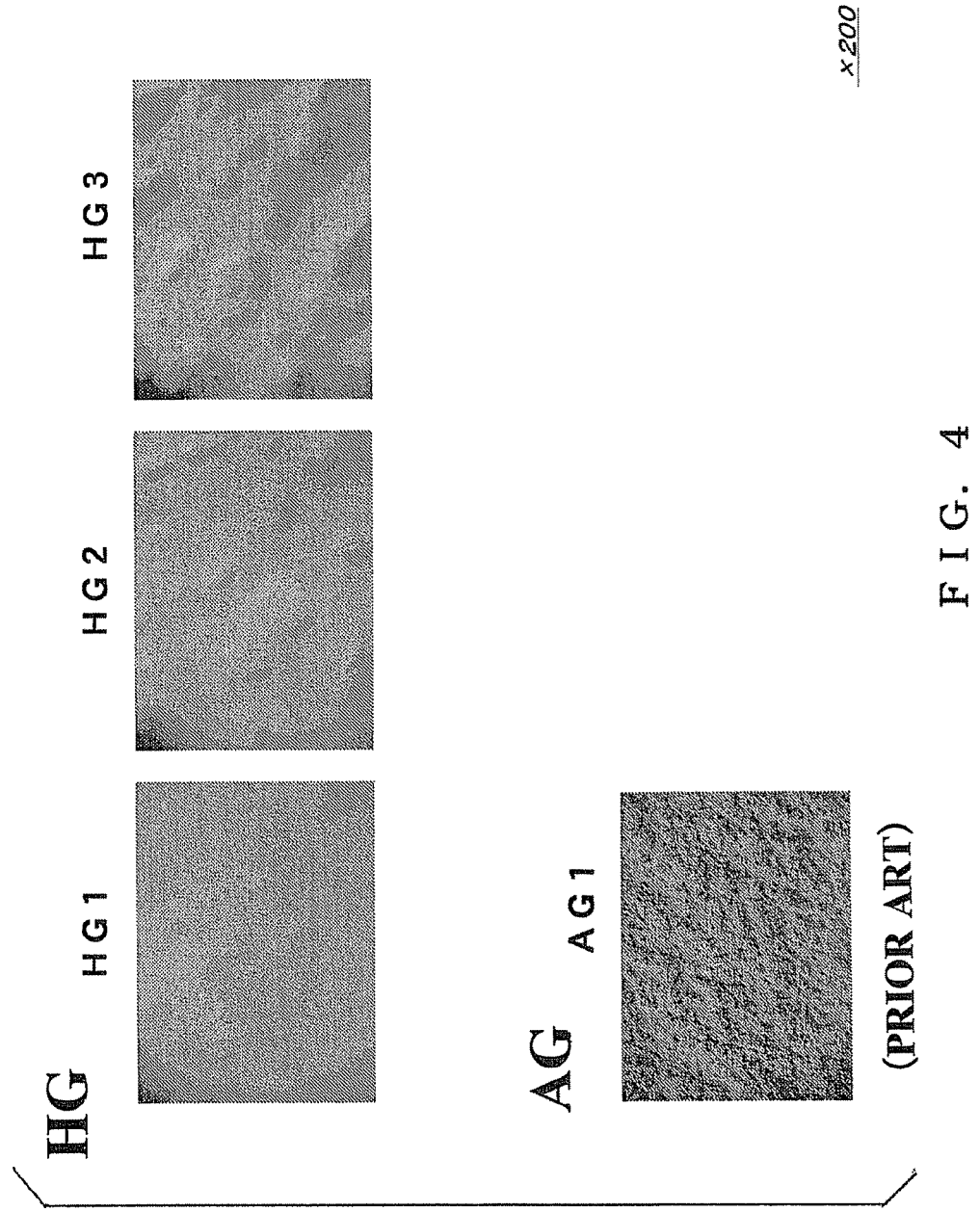
FIG. 4 is an optical photomicrograph of a surface shape of each of an optical laminate according to the present invention and a conventional anti-dazzling optical laminate.
Figure 5:
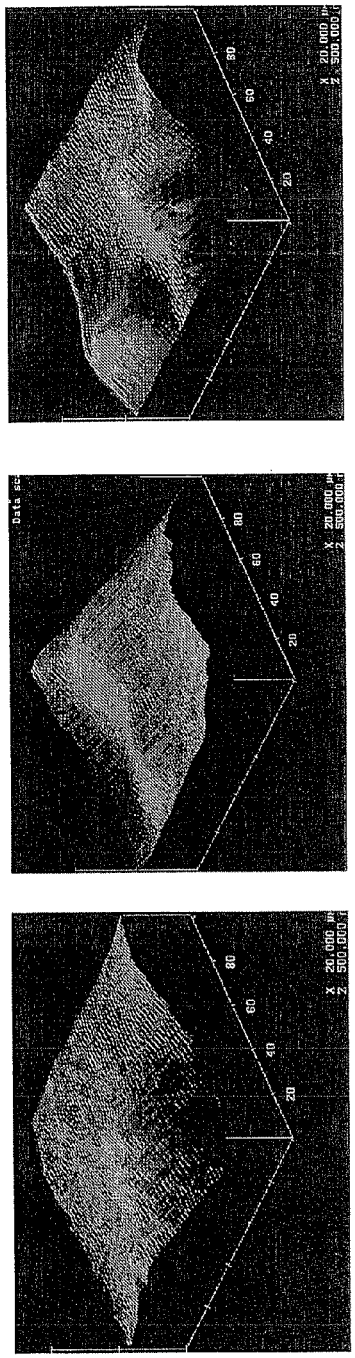
FIG. 5 is a photograph of an optical laminate according to the present invention taken by three-dimensional measurement under AFM.
Figure 5:
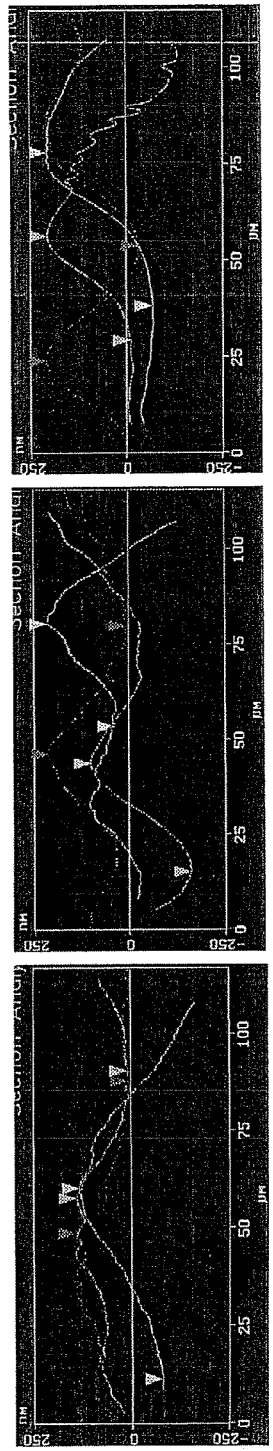
Figure 6:
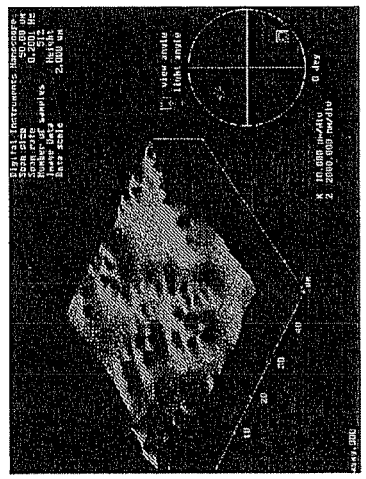
FIG. 6 is a photograph of a conventional optical laminate taken by three-dimensional measurement under AFM.
Figure 6:
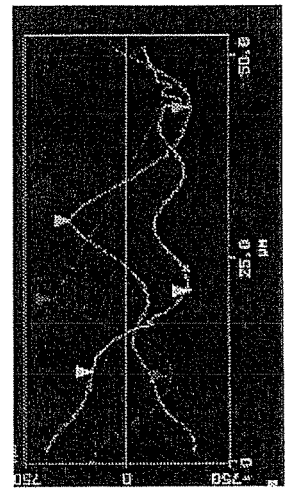

The following evaluation tests were carried out. The results are shown in FIG. 4 to FIG. 6 and Table 2 (results of evaluation items 3 to 6).

Evaluation 1: Planar Shape Evaluation Test

Each of the optical laminates of Example and Comparative Example was mounted on a panel of an image display device, and the surface shape was photographed with an optical microscope (tradename; BX60-F3, manufactured by OLYMPUS; 200 times). The results were as shown in FIG. 4. As can be seen from FIG. 4, for HG1 to HG3 which are optical laminates according to the present invention, the waviness of the concavoconvex shape was smooth, the concavoconvex shape is not sharp, and the whole surface is in the form of a plurality of very gently sloping hills. On the other hand, for AG1 which is a conventional anti-dazzling optical laminate, the surface is rough like an enlarged photograph of the human skin, and the concavoconvex shape is sharp.

Evaluation 2: Three-dimensionality Evaluation Test for Concavoconvex Shape

Each of the optical laminates of Example and Comparative Example was mounted on a panel of an image display device, and the surface shape was photographed with AFM (tradename: a scanning probe microscope). The results were as shown in FIGS. 5 and 6. As can be seen from FIG. 5, for HG1 to HG3 which are optical laminates according to the present invention, the waviness of the concavoconvex shape was very smooth, the concavoconvex shape is not sharp, and the whole surface is in the form of a plurality of very gently sloping hills. On the other hand, as can be seen from FIG. 6, for AG1 which is a conventional anti-dazzling optical laminate, the surface is in the form of a number of sharp concavoconvex shapes.

Evaluation 3: Optical Characteristics Test

For the optical laminates of Example and Comparative Example, the haze value (%), 60-degree gloss, Sm, θa, Rz, reflection Y value (5-degree reflection), electrical surface resistance, and layer thickness difference (H−R or H'-R) were measured according to the definition described in the present specification.

Evaluation 4: Glossy Black Feeling Test

A crossed Nicol polarizing plate was applied onto each of the optical laminates of Example and Comparative Example on its side remote from the film. Sensory evaluation was carried out under three-wavelength fluorescence, and glossy black feeling (reproduction of glossy black) was evaluated in detail according to the following criteria.

Evaluation Criteria

○: Glossy black could be reproduced.

Δ: Glossy black could be somewhat reproduced but was unsatisfactory as a product.

x: Glossy back could not be reproduced.

Evaluation 5: Glare Test

A black matrix pattern plate (105 ppi, 140 ppi) formed on a 0.7 mm-thick glass was placed on a viewer manufactured by HAKUBA (light viewer 7000PRO) so that the pattern surface faced downward. The optical laminate film prepared above was placed thereon so that the concavoconvex face was on the air side. Glare was visually observed in a dark room while lightly pressing with a finger the edge of the film to prevent the lift of the film, and the results were evaluated.

Evaluation Criteria

⊚: No glare was observed at 140 ppi, and the antiglareness was good.

○: No glare was observed at 105 ppi, and the antiglareness was good.

x: Glare was observed at 105 ppi, and the antiglareness was poor.

Evaluation 6: Anti-dazzling Evaluation Test

A black acrylic plate was applied onto the backside of the optical laminate with the aid of an optical pressure-sensitive adhesive. The sample was placed on a horizontal desk. White fluorescent lamps (32 W×2 lamps) were disposed 2.5 m above the desk. Reflection of the edge part of the white fluorescent lamps was visually observed and was evaluated.

Evaluation Criteria

○: The edge was not reflected, and the anti-dazzling property was good.

x: The edge was reflected, and the anti-dazzling property was poor.

TABLE 1

| | Composition for anti-dazzling layer | | | | | | | |
|---|---|---|---|---|---|---|---|---|
| | Light transparent fine particles | | | Binder | | | Solvent composition | Difference in refractive index between light transparent fine particles and binder |
| | Average particle diameter | Material | Weight ratio per unit area between resin and particle | Refractive index | Addition amount of polymer (based on binder) | Monomer ratio | Refractive index | (Ratio of toluene to coating composition component) | |
| Ex. 1 | 5.0 μm | PMMA | 0.20 | 1.535 | PMMA polymer 10 wt % (mw 75000) | PETA:DPHA = 65:35 wt % | 1.51 | Toluene:cyclohexanone = 80:20 wt % (40.5 wet %) | 0.025 |
| Ex. 2 | 9.5 μm | → | → | → | → | → | → | → | → |
| Ex. 3 | 13.5 μm | → | 0.10 | → | → | → | → | → | → |
| Ex. 4 | 13.5 μm | → | 0.015 | → | → | → | → | → | → |
| Ex. 5 | 9.5 μm | → | 0.20 | → | → | → | → | → | → |
| Ex. 6 | 5.0 μm | → | | → | → | → | → | → | → |
| Ex. 7 | A) 9.5 μm B) 5.0 μm Mixed particle system | → | Total: 0.20 A) 0.15 B) 0.05 | → | → | → | → | → | → |
| Ex. 8 | 13.5 μm | → | 0.10 | 1.535 | → | → | 1.51 | → | 0.025 |
| Ex. 9 | → | → | → | → | → | → | → | → | → |
| Ex. 10 | → | → | → | 1.535 | → | → | 1.51 | → | 0.025 |
| Ex. 11 | → | PMMA (Hydrophilic behavior) | → | 1.535 | PMMA polymer 8 wt % (mw 75000) St = PMMA polymer 2 wt % | PETA:DPHA = 70:30 wt % | 1.54 | Toluene:cyclohexanone = 80:20 wt % (42.0 wet %) | 0.015 |
| Ex. 12 | 1.9 μm | | 0.18 | | | | | | |
| Ex. 13 | 4.6 μm | PMMA (Hydrophobic behavior) | 0.26 | 1.535 | (mw 65000) PMMA polymer 10 wt % | → | 1.51 | → | → |
| Ex. 14 | A) 4.6 μm B) 3.5 μm Mixed particle system | → | Total: 0.20 A) 0.15 B) 0.05 | 1.535 | (mw 75000) → | → | 1.51 | → | 0.025 |
| Ex. 15 | A) 3.5 μm (n = 1.53) B) 3.5 μm (n = 1.52) Mixed particle system *Different in composition | PMMA (Different in crosslinking agent) | Total: 0.20 A) 0.15 B) 0.05 | → | → | → | → | → | → |

TABLE 1-continued

| | Composition for anti-dazzling layer | | | | | | | |
|---|---|---|---|---|---|---|---|---|
| | Light transparent fine particles | | | | Binder | | Solvent composition | Difference in refractive index between light transparent fine particles and binder |
| | Average particle diameter | Material | Weight ratio per unit area between resin and particle | Refractive index | Addition amount of polymer (based on binder) | Monomer ratio | Refractive index | (Ratio of toluene to coating composition component) |
| Ex. 16 | A) 5.0 μm<br>B) 1.8 μm<br>Mixed particle system | A) St<br>B) Melamine | Total: 0.24<br>A) 0.15<br>B) 0.09 | A) 1.60<br>B) 1.68 | | | 1.51 | | 0.16 |
| Ex. 17 | A) 3.5 μm<br>B) 1.5 μm<br>Mixed particle system | A) St<br>B) PMMA | Total: 0.19<br>A) 0.10<br>B) 0.09 | A) 1.60<br>B) 1.49 | PMMA polymer 10 wt % (mw 45000) | Coating liquid 10 for anti-dazzling layer (Zr-containing resin matrix) | 1.60 | → | 0.11 |
| Ex. 18 | A) 4.6 μm<br>B) 3.5 μm<br>Mixed particle system | → | Total: 0.20<br>A) 0.15<br>B) 0.05 | 1.535 | → | n = 1.60<br>PETA:DPHA = 70:30 wt % | 1.51 | → | 0.025 |
| Ex. 19 | A) 13.5 μm<br>B) 2.5 ± 2.0 μm<br>Mixed particle system | → | Total: 0.175<br>A) 0.10<br>B) 0.075 | 1.535 | PMMA polymer 10 wt % (mw 75000) | → | 1.51 | Toluene:cyclohexanone = 80:20 wt % (42.0 wet %) | 0.055 |
| Ex. 20 | 7.0 μm | PMMA | 0.50 | 1.53 | → | → | 1.51 | → | 0.025 |
| Ex. 21 | → | → | 0.75 | → | → | PETA:DPHA = 65:35 wt % | → | → | → |
| Ex. 22 | → | → | 1.00 | → | → | → | → | → | → |
| Ex. 23 | → | → | 1.15 | → | → | → | → | → | 0.025 |
| Ex. 24 | 9.0 μm<br>3.5 μm<br>Mixed particle system | 9.0 μm … PMMA<br>3.5 μm … St | 0.215<br>(9.0 μm … 0.15<br>3.5 μm … 0.065) | 9.0 μm …<br>n = 1.535<br>3.5 μm …<br>n = 1.60 | PMMA polymer 10 wt % (mw 75000) | PETA:DPHA = 85:35 wt % | 1.51 | Toluene:cyclohexanone = 80:20 wt % (40.5 wet %) | 0.09 |
| Ex. 25 | 9.0 μm<br>3.5 μm<br>Mixed particle system | 9.0 μm … PMMA<br>3.5 μm … St | 0.265<br>(9.0 μm … 0.10<br>3.5 μm … 0.165) | 9.0 μm …<br>n = 1.535<br>3.5 μm …<br>n = 1.60 | → | → | → | → | → |

TABLE 1-continued

| | Composition for anti-dazzling layer | | | | | | | | |
|---|---|---|---|---|---|---|---|---|---|
| | Light transparent fine particles | | | | Binder | | Solvent | | Difference in refractive index between light transparent fine particles and binder |
| | Average particle diameter | Material | Weight ratio per unit area between resin and particle | Refractive index | Addition amount of polymer (based on binder) | Monomer ratio | Refractive index | composition (Ratio of toluene to coating composition component) | |
| Ex. 26 | 9.0 μm 3.5 μm Mixed particle system | 9.0 μm...PMMA 3.5 μm...St | 0.380 (9.0 μm...0.10 3.5 μm...0.280) | 9.0 μm...n = 1.535 3.5 μm...n = 1.60 | → | → | → | → | → |
| Ex. 27 | 7.0 μm | PMMA | 0.55 | n = 1.535 | → | → | → | → | → |
| Ex. 28 | 7.0 μm 3.5 μm 2.5 μm Mixed particle system | 7.0 μm...PMMA 3.5 μm...St 2.5 μm...Silica | 0.215 (7.0 μm...0.15 3.5 μm...0.165 2.5 μm...0.035) | 7.0 μm...n = 1.536 3.5 μm...n = 1.60 2.5 μm... n = 1.47 to 1.50 | → | → | → | → | ↓ 0.025 0.09 0.01 to 0.04 |
| Comp. Ex. 1 | Average particle diameter 2.5 μm Amorphous silica | Silica | 0.10 | 1.47 to 1.50 | PMMA polymer 1.25 wt % (mw 45000) | PETA = 100 | 1.51 | Toluene:MIBK = 90:10 wt % (30.5 wet %) | 0.01 to 0.04 |
| Comp. Ex. 2 | Average particle diameter 2.5 μm Amorphous silica | Silica | 0.12 | → | → | → | → | → | → |
| Comp. Ex. 3 | 3.5 | PMMA | 0.2 | 1.535 | PMMA polymer 10 wt % | PETA:DPHA = 85:35 wt % | 1.51 | Toluene:cyclohexanone = 80:20 wt % (40.5 wet %) | 0.025 |
| Comp. Ex. 4 | 5 | → | → | → | (mw 75000) | → | → | → | → |
| Comp. Ex. 5 | 5 ± 3.0 (Particle size distribution) | → | → | → | → | → | → | → | → |

*Particle size distribution of monodisperse fine particles is average particle diameter ± 0.3 to 1.0 μm.

TABLE 2

| | Overall haze (%) | Internal haze (%) | 60-degree gloss | Surface roughness Sm | Surface roughness θa | Surface roughness Rz | Reflection Y value (5-degree reflection) | Electrical surface resistance | Film thickness difference HR | Evaluation 4 Glossy blackness | Evaluation 5 Glare | Evaluation 6 Anti-dazzling property |
|---|---|---|---|---|---|---|---|---|---|---|---|---|
| Ex. 1 | 0.3 | 0.1 | 98.7 | 233.1 | 0.384 | 0.606 | — (* No low-refractive index layer: 4%) | — (*Antistatic layer: overrange for antistatic layer-free product) | 2.1 | ○ | ○ | ○ |
| Ex. 2 | 0.4 | 0.1 | 94.6 | 170.2 | 0.504 | 0.663 | — | — | 4.2 | ○ | ○ | ○ |
| Ex. 3 | 0.6 | 0.1 | 90.3 | 362.5 | 0.539 | 1.040 | — | — | 6.5 | ○ | ○ | ○ |
| Ex. 4 | 0.5 | 0.1 | 92.3 | 354.1 | 0.478 | 0.833 | — | — | 5.3 | ○ | ○ | ○ |
| Ex. 5 | 0.4 | 0.1 | 94.8 | 375.1 | 0.422 | 0.482 | — | — | 3.6 | ○ | ○ | ○ |
| Ex. 6 | 0.4 | 0.1 | 93.2 | 192.3 | 0.621 | 0.834 | — | — | 1.5 | ○ | ○ | ○ |
| Ex. 7 | 0.5 | 0.1 | 94.9 | 201.3 | 0.532 | 0.743 | — | — | 4.6 | ○ | ○ | ○ |
| Ex. 8 | 1.4 | 0.2 | 93.2 | 323.1 | 0.912 | 0.893 | — | $2.0 \times 10^{12}$ | 6.2 | ○ | ○ | ○ |
| Ex. 9 | 1.8 | 0.2 | 93.1 | 367.3 | 0.623 | 0.982 | — | $3.2 \times 10^{12}$ | 6.5 | ○ | ○ | ○ |
| Ex. 10 | 0.5 | 0.1 | 65.3 | 392.3 | 0.432 | 0.732 | 1.80% | — | 6.9 | ○ | ○ | ○ |
| Ex. 11 | 1.3 | 0.2 | 56.2 | 245.3 | 0.392 | 0.652 | 1.2% | — | 5.9 | ○ | ○ | ○ |
| Ex. 12 | 0.4 | 0.1 | 94.2 | 130.5 | 0.324 | 0.532 | — | — | 0.3 | ○ | ○ | ○ |
| Ex. 13 | 1.4 | 0.2 | 89.3 | 107.8 | 0.384 | 0.593 | — | — | 1.2 | ○ | ○ | ○ |
| Ex. 14 | 0.8 | 0.1 | 87.4 | 123.5 | 0.401 | 0.621 | — | — | 0.9 | ○ | ○ | ○ |
| Ex. 15 | 0.6 | 0.1 | 83.2 | 132.3 | 0.453 | 0.582 | — | — | 0.4 | ○ | ○ | ○ |
| Ex. 16 | 52.8 | 51.2 | 84.2 | 152.6 | 0.443 | 0.541 | — | — | 1.8 | ○ | ◎ | ○ |
| Ex. 17 | 41.3 | 40.1 | 89.3 | 143.2 | 0.412 | 0.533 | — | — | 0.9 | ○ | ◎ | ○ |
| Ex. 18 | 0.6 | 0.1 | 87.2 | 136.7 | 0.473 | 0.611 | — | — | 0.8 | ○ | ○ | ○ |
| Ex. 19 | 5.2 | 3.6 | 74.3 | 323.4 | 0.542 | 0.892 | — | — | 6.2 | ○ | ○ | ○ |
| Ex. 20 | 0.5 | 0.1 | 90.8 | 265.4 | 0.398 | 0.875 | — | — | 3.2 | ○ | ○ | ○ |
| Ex. 21 | 0.6 | 0.1 | 86.2 | 234.4 | 0.432 | 0.789 | — | — | 2.9 | ○ | ○ | ○ |
| Ex. 22 | 0.8 | 0.1 | 79.3 | 187.3 | 0.567 | 0.745 | — | — | 2.4 | ○ | ○ | ○ |
| Ex. 23 | 1.3 | 0.2 | 77.3 | 134.5 | 0.621 | 0.683 | — | — | 2.6 | ○ | ○ | ○ |
| Ex. 24 | 15.3 | 14.5 | 92.1 | 165.2 | 0.652 | 0.686 | — | — | 5.8 | ○ | ◎ | ○ |
| Ex. 25 | 25.9 | 25.1 | 94.3 | 183.1 | 0.536 | 0.633 | — | — | 5.6 | ○ | ◎ | ○ |
| Ex. 26 | 37.1 | 36.5 | 89.3 | 174.5 | 0.678 | 0.755 | — | — | 5.6 | ○ | ◎ | ○ |
| Ex. 27 | 39.8 | 38.2 | 61.4 | 104.2 | 1.183 | 1.185 | — | — | 19.5 | ○ | ○ | ○ |
| Ex. 28 | 34.5 | 32.4 | 65.3 | 136.3 | 0.953 | 0.893 | — | — | 5.2 | ○ | ○ | ○ |
| Comp. Ex. 1 | 4.7 | 0.1 | 48.2 | 93.2 | 1.892 | 1.439 | — | — | 0.4 | X | X | ○ |
| Comp. Ex. 2 | 3.8 | 0.1 | 65.0 | 267.2 | 1.857 | 1.932 | — | — | 0.8 | X | X | ○ |
| Comp. Ex. 3 | 18.6 | 0.1 | 38.6 | 65.2 | 1.892 | 1.213 | — | — | 0.2 | X | X | ○ |
| Comp. Ex. 4 | 0.5 | 0.2 | 97.8 | 920.4 | 0.393 | 0.611 | — | — | 26 | ○ | ○ | X |
| Comp. Ex. 5 | 22.4 | 0.1 | 34.2 | 82.3 | 2.135 | 1.451 | — | — | 1.5 | X | X | ○ |

The invention claimed is:

1. An optical laminate comprising:
   a light transparent base material; and
   an anti-dazzling layer provided on the light transparent base material;
   wherein an outermost surface of the anti-dazzling layer has a concavoconvex shape, the anti-dazzling layer is formed using a composition for an anti-dazzling layer comprising a resin and fine particles, and the resin and the fine particles satisfy a requirement of n is not less than 0 and not more than 0.05, wherein n represents a difference between a refractive index of the resin and a refractive index of the fine particles; and
   wherein the concavoconvex shape of the anti-dazzling layer satisfies the following requirements:
   Sm is not less than 100 µm and not more than 600 µm,
   θa is not less than 0.1 degree and not more than 1.2 degrees, and
   Rz is more than 0.2 µm and not more than 1 µm,
   wherein Sm represents an average spacing of concavoconvexes in the anti-dazzling layer, θa represents an average inclination angle of the concavoconvexes, and Rz represents an average roughness of the concavoconvexes, and wherein Rz is measured at a reference length of 2.5 mm.

2. The optical laminate according to claim 1, wherein the fine particles are inorganic fine particles or organic fine particles.

3. The optical laminate according to claim 1, wherein the fine particles are aggregation-type fine particles.

4. The optical laminate according to claim 1, wherein the fine particles have an average particle diameter R of not less than 1.0 µm and not more than 20 µm.

5. The optical laminate according to claim 1, wherein a value obtained by subtracting an average particle diameter R µm of the fine particles from a thickness H µm of the anti-dazzling layer, "H–R," is not less than 0.3 µm and not more than 20 µm.

6. The optical laminate according to claim 1, wherein 80% of a total number of the fine particles have an average particle diameter distribution of R±1.0 µm, wherein R represents the average particle diameter of the fine particles.

7. The optical laminate according to claim 1, wherein the fine particles and the resin satisfy a requirement for a total weight ratio per unit area between the fine particles and the resin of m/M is not less than 0.01 and not more than 1.2, wherein m represents a total weight per unit area of the fine particles and M represents a total weight of the resin per unit area.

8. The optical laminate according to claim 1, wherein the resin comprises an ionizing radiation curing resin and a heat curing resin.

9. The optical laminate according to claim 1, wherein the anti-dazzling layer further contains an electroconductive agent.

10. The optical laminate according to claim 9, wherein the electroconductive agent is electroconductive fine particles or an electroconductive polymer.

11. The optical laminate according to claim 1, wherein a surface modifying layer is provided on the surface of the concavoconvex shape of the anti-dazzling layer.

12. The optical laminate according to claim 11, wherein a low-refractive index layer having a refractive index that is lower than a refractive index of the anti-dazzling layer, or a refractive index of the surface modifying layer is further provided on the surface of the anti-dazzling layer or the surface of the surface-modifying layer.

13. The optical laminate according to claim 12, wherein the low-refractive index layer contains hollow silica.

14. The optical laminate according to claim 1, wherein Rz is more than 0.2 µm and not more than 1.2 µm.

15. The optical laminate according to claim 1, wherein an internal haze value is not less than 0.1 and not more than 55.

16. A polarizing plate, comprising a polarizing element, and an optical laminate according to claim 1 provided on a surface of the polarizing element, so that a surface of the optical laminate that is remote from the anti-dazzling layer faces the surface of the polarizing plate.

17. An image display device comprising:
a transmission display;
a light source device for applying light to the transmission display from its backside; and
an optical laminate according to claim 1 provided on a surface of the transmission display.

18. An image display device comprising:
a transmission display;
a light source device for applying light to the transmission display from its backside; and
a polarizing plate according to claim 16 provided on a surface of the transmission display.

19. The optical laminate according to claim 1, wherein Rz is more than 0.2 µm and not more than 0.893 µm.

20. The optical laminate according to claim 1, wherein a surface haze value is not less than 0.2% and not more than 3.5%.

21. The optical laminate according to claim 1, wherein a reflection value Y is not less than 0.5% and not more than 4.5%.

22. An optical laminate comprising:
a light transparent base material; and
an anti-dazzling layer provided on the light transparent base material;
wherein an outermost surface of the anti-dazzling layer has a concavoconvex shape, the anti-dazzling layer is formed using a composition for an anti-dazzling layer comprising a resin and fine particles, and the resin and the fine particles satisfy a requirement of n is not less than 0.05 and not more than 0.2, wherein n represents a difference between a refractive index of the resin and a refractive index of the fine particles; and
wherein the concavoconvex shape of the anti-dazzling layer satisfies the following requirements:
Sm is not less than 100 µm and not more than 600 µm,
θa is not less than 0.1 degree and not more than 1.2 degrees, and
Rz is more than 0.2 µm and not more than 1 µm,
wherein Sm represents an average spacing of concavoconvexes in the anti-dazzling layer, θa represents an average inclination angle of the concavoconvexes, and Rz represents an average roughness of the concavoconvexes, and wherein Rz is measured at a reference length of 2.5 mm.

23. The optical laminate according to claim 1, wherein the fine particles comprise first fine particles and second fine particles, and wherein the first and second fine particles satisfying the following formula:

$$0.25R \leq r \leq 1.0R$$

wherein "R" represents an average particle diameter of the first fine particles in µm, and wherein "r" represents an average particle diameter of the second fine particles in µm.

24. The optical laminate according to claim 1, wherein the concavoconvex shape of the anti-dazzling layer is defined by the fine particles.

* * * * *